United States Patent
McGowan et al.

(10) Patent No.: US 11,554,829 B2
(45) Date of Patent: Jan. 17, 2023

(54) PIVOT JOINT AND VEHICLES THAT EMPLOY A PIVOT JOINT

(71) Applicant: Yvolve Sports LIMITED, Dublin (IE)

(72) Inventors: John McGowan, Balbriggan (IE); David Manton, Swords (IE); Barry Whyte, The Curragh (IE); Shane Connaughton, Dublin (IE)

(73) Assignee: YVOLVE SPORTS LIMITED, Dublin (IE)

(*) Notice: Subject to any disclaimer, the term of this patent is extended or adjusted under 35 U.S.C. 154(b) by 116 days.

(21) Appl. No.: 17/210,443

(22) Filed: Mar. 23, 2021

(65) Prior Publication Data

US 2021/0206450 A1 Jul. 8, 2021

Related U.S. Application Data

(62) Division of application No. 16/310,794, filed as application No. PCT/IB2017/053569 on Jun. 15, 2017, now Pat. No. 10,953,949.

(Continued)

(51) Int. Cl.
*B62K 21/18* (2006.01)
*B62K 3/00* (2006.01)
(Continued)

(52) U.S. Cl.
CPC .............. *B62K 21/18* (2013.01); *B62J 17/08* (2013.01); *B62K 3/002* (2013.01); *B62K 5/05* (2013.01);
(Continued)

(58) Field of Classification Search
CPC .......... B62K 21/18; B62K 3/002; B62K 5/05; B62K 5/08; B62K 9/02; B62K 15/00;
(Continued)

(56) References Cited

U.S. PATENT DOCUMENTS 4,071,256 A * 1/1978 Kimmell .............. A63C 17/012
280/11.28
4,614,452 A * 9/1986 Wang ...................... F16C 11/10
403/97

(Continued)

FOREIGN PATENT DOCUMENTS

CA        2304408 A1    10/2001
CN      201566775 U     9/2010
(Continued)

OTHER PUBLICATIONS

Office Action for CN Patent application No. 201710452623.6 dated Jun. 21, 2021.

(Continued)

*Primary Examiner* — Jacob B Meyer
(74) *Attorney, Agent, or Firm* — Aird & McBurney LP

(57) ABSTRACT

In an aspect, a pivot joint for a collapsing foot-deck-based vehicle is described, comprising a foot deck, at least two wheels coupled to the foot deck, and a handlebar assembly coupled to the foot deck via a locking pivot joint, also referred to as a locking swivel joint, the handlebar assembly comprising at least one handle, the locking pivot joint having a pivot axis that is generally unparallel with a horizontal plane defined by the lowermost surfaces of the at least two wheels, the handlebar assembly being selectively pivotable via the locking pivot joint between a riding configuration in which the handle is generally distal from the foot deck and a collapsed configuration in which the handle is generally proximal to the foot deck.

10 Claims, 23 Drawing Sheets

Related U.S. Application Data

(60) Provisional application No. 62/483,906, filed on Apr. 10, 2017, provisional application No. 62/377,541, filed on Aug. 20, 2016, provisional application No. 62/350,633, filed on Jun. 15, 2016.

(51) Int. Cl.
| | |
|---|---|
| *B62K 15/00* | (2006.01) |
| *B62J 17/08* | (2020.01) |
| *B62K 9/02* | (2006.01) |
| *F16C 11/10* | (2006.01) |
| *B62K 5/05* | (2013.01) |
| *B62K 5/08* | (2006.01) |
| *B62B 7/04* | (2006.01) |
| *B62B 9/14* | (2006.01) |

(52) U.S. Cl.
CPC .............. *B62K 5/08* (2013.01); *B62K 9/02* (2013.01); *B62K 15/00* (2013.01); *B62K 15/006* (2013.01); *F16C 11/10* (2013.01); *B62B 7/044* (2013.01); *B62B 9/14* (2013.01); *B62K 2206/00* (2013.01)

(58) Field of Classification Search
CPC .... B62K 15/006; B62K 2206/00; B62J 17/08; F16C 11/10; B62B 7/044; B62B 9/14; B62B 7/12
See application file for complete search history.

(56) References Cited

U.S. PATENT DOCUMENTS

| | | | | |
|---|---|---|---|---|
| 5,062,179 | A * | 11/1991 | Huang | F16C 11/10 403/93 |
| 5,123,768 | A * | 6/1992 | Franklin | F16C 11/10 403/96 |
| 5,377,368 | A * | 1/1995 | Cheng | A47D 13/063 16/329 |
| 5,765,958 | A * | 6/1998 | Lan | F16C 11/10 403/93 |
| 5,887,935 | A * | 3/1999 | Sack | B62B 9/00 280/47.38 |
| 5,906,010 | A | 5/1999 | Suzuki | |
| 6,315,304 | B1 * | 11/2001 | Kirkland | A63C 17/012 280/11.28 |
| 6,315,312 | B1 * | 11/2001 | Reyes | A63C 17/01 280/11.27 |
| 6,428,023 | B2 * | 8/2002 | Reyes | A63C 17/012 280/11.27 |
| 6,508,689 | B1 | 1/2003 | Mikkelsen et al. | |
| 6,523,837 | B2 * | 2/2003 | Kirkland | A63C 17/012 280/11.28 |
| 6,550,801 | B1 * | 4/2003 | Newhard | B62B 7/06 403/97 |
| 6,565,111 | B2 * | 5/2003 | Ageneau | B62B 9/20 280/647 |
| 6,742,849 | B1 * | 6/2004 | Denby | B62K 25/02 301/124.2 |
| 6,761,417 | B2 * | 7/2004 | Denby | B62K 25/02 301/124.2 |
| 6,948,197 | B1 * | 9/2005 | Chen | F16C 11/10 5/655 |
| 7,219,907 | B2 * | 5/2007 | Chang | A63C 17/012 280/87.041 |
| 7,413,200 | B2 * | 8/2008 | Horn | A63C 17/0093 280/11.27 |
| 8,801,022 | B2 * | 8/2014 | Song | B62M 6/40 280/278 |
| 8,925,153 | B1 * | 1/2015 | McGrath | E05D 11/1007 16/334 |
| 9,381,968 | B2 * | 7/2016 | Chan | B62K 5/02 |
| 9,534,628 | B1 * | 1/2017 | Wang | F16C 11/10 |
| 9,566,995 | B2 * | 2/2017 | Strauss | B62B 7/06 |
| 9,610,803 | B2 * | 4/2017 | Schlanger | B60B 1/003 |
| 10,393,310 | B2 * | 8/2019 | Shen | F16M 13/022 |
| 10,526,034 | B2 * | 1/2020 | Hadley | B62K 21/26 |
| 10,683,965 | B2 * | 6/2020 | Shen | A47B 21/0314 |
| 2002/0011713 | A1 * | 1/2002 | Kirkland | B62K 3/002 280/87.041 |
| 2004/0084955 | A1 * | 5/2004 | Denby | B62K 25/02 301/124.2 |
| 2004/0112167 | A1 * | 6/2004 | Ying | B62K 21/12 74/551.3 |
| 2004/0179891 | A1 * | 9/2004 | Watkins | F16C 11/10 403/96 |
| 2007/0164530 | A1 * | 7/2007 | Horn | A63C 17/01 280/87.042 |
| 2010/0327547 | A1 * | 12/2010 | Wilson | A63C 17/012 280/87.042 |
| 2011/0018226 | A1 * | 1/2011 | Jessie, Jr. | B62K 9/02 280/282 |
| 2011/0031783 | A1 | 2/2011 | Zhong | |
| 2013/0308887 | A1 * | 11/2013 | Gesmer | A63C 17/012 384/523 |
| 2014/0112702 | A1 * | 4/2014 | Mighells | F16C 11/10 403/92 |
| 2014/0375016 | A1 * | 12/2014 | Kettler | B62K 21/10 280/279 |
| 2015/0224416 | A1 | 8/2015 | Schildknecht Hoè et al. | |
| 2018/0065702 | A1 * | 3/2018 | Desberg | B62H 1/02 |
| 2019/0054366 | A1 * | 2/2019 | Sandusky | A63C 17/0046 |
| 2019/0241232 | A1 * | 8/2019 | McGowan | B62K 3/002 |
| 2020/0008990 | A1 * | 1/2020 | Harrison | B62K 5/025 |
| 2020/0148296 | A1 * | 5/2020 | Chang | B60B 33/066 |

FOREIGN PATENT DOCUMENTS

| | | |
|---|---|---|
| CN | 201849606 U | 6/2011 |
| CN | 203450283 U | 2/2014 |
| CN | 203698545 U | 7/2014 |
| CN | 204184530 U | 3/2015 |
| CN | 208085899 U | 11/2018 |
| EP | 2457772 A1 | 5/2012 |
| GB | 1105443 A | 3/1968 |
| GB | 2372305 A | 8/2002 |
| WO | 2014/205217 A1 | 12/2014 |

OTHER PUBLICATIONS

English Translation of CN 204184530 from Totalpatentone dated Mar. 16, 2021.
English Translation of CN 203698545 from Totalpatentone dated Jul. 14, 2020.
PCT/IB2017/053569, International Search Report & Written Opinion, dated Nov. 9, 2017, European Patent Office.
Office Action for CN Patent application No. 201710452623.6 dated Mar. 13, 2020.

* cited by examiner

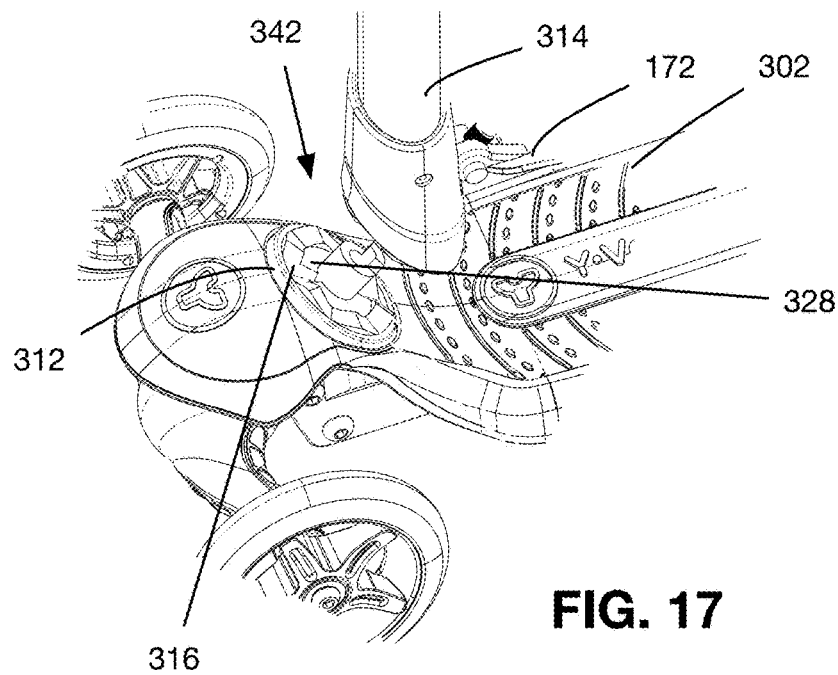
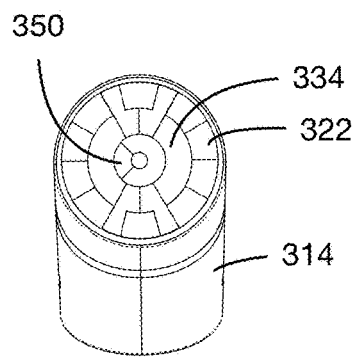
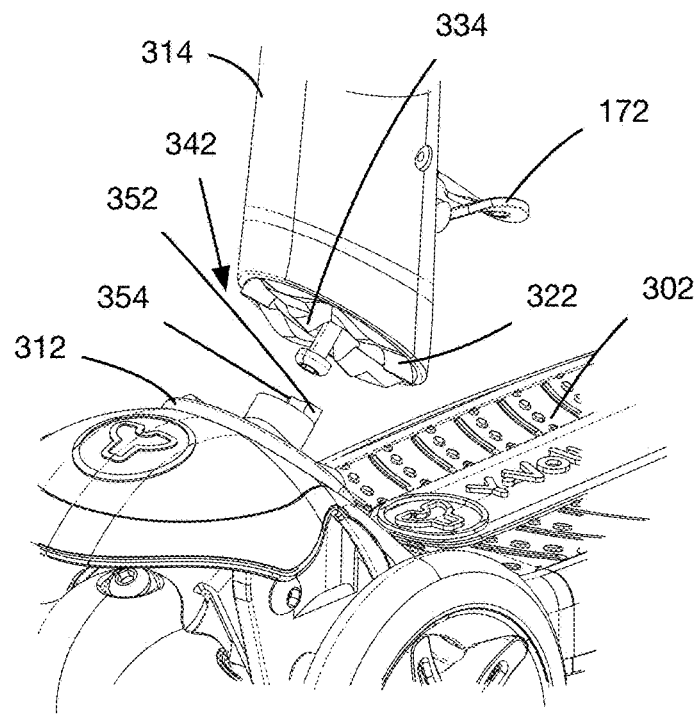
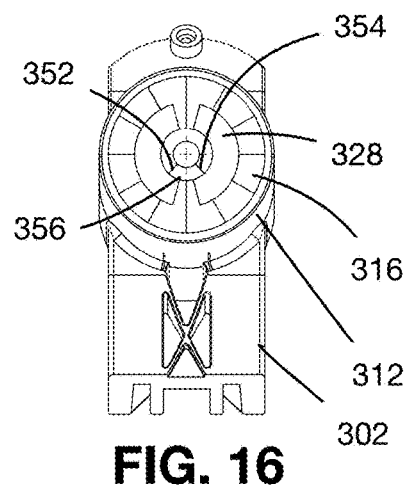
FIG. 17
FIG. 15
FIG. 16
FIG. 18

PIVOT JOINT AND VEHICLES THAT EMPLOY A PIVOT JOINT

CROSS-REFERENCE TO RELATED APPLICATIONS

This application is a divisional application of U.S. application Ser. No. 16/310,794 filed on Dec. 27, 2018 which is a national stage entry of International Application No. PCT/IP2017/053569 filed on Jun. 15, 2017 which claims priority to U.S. Provisional Patent Application No. 62/350,633 filed Jun. 15, 2016, to U.S. Provisional Patent Application No. 62/377,541 filed Aug. 20, 2016, and to U.S. Provisional Patent Application No. 62/483,906 filed Apr. 10, 2017, the contents of all of which are incorporated herein in their entirety.

FIELD OF THE DISCLOSURE

The specification relates generally to pivot joints and more particularly for pivot joints used in foot-deck-based vehicles and other vehicles, permitting portions of such vehicles to be lockable in at least two positions.

BACKGROUND OF THE DISCLOSURE

Vehicles, such as foot-deck based vehicles, such as scooters, have become very popular. In many cases, the foot deck on such vehicles has a long fore-aft dimension to accommodate both feet of a rider atop thereof, one behind the other. These foot-deck-based vehicles typically have two or more wheels, with at least one at each end thereof along the fore-aft dimension.

Some foot-deck-based vehicles include handlebar assemblies that can be grasped during operation. The handlebar assemblies may include a handlebar stem that extends upward from the foot deck. In some cases handlebar handles extend substantially laterally from an opposite end of the handlebar stem.

Without providing a folding mechanism for folding the handlebar assembly relative to the foot deck, these vehicles could require relatively large spaces for storage or transport. Further, such foot-deck-based vehicles may be difficult to transport when not being ridden, as they can be unwieldy to carry.

In some cases, these foot-deck-based vehicles are designed to be collapsible to facilitate storage and carrying. Typically, a down tube connecting a foot deck assembly, which includes the foot deck and the rear wheel(s), and a head assembly, which includes a head tube in which the handlebar assembly and front wheel assembly is received, is jointed or is connected to the foot deck assembly via a joint to permit folding of the head assembly relative to the foot deck assembly.

FIG. 1A shows an exemplary collapsing foot-deck-based vehicle 20 having a foot deck assembly 24 and a head assembly 28. The foot deck assembly 24 includes a foot deck 32 having a fore end 36 and an aft end 40. The foot deck 32 has a generally flat upper surface upon which a rider's feet are positioned and may include a traction insert or surface adhesive to reduce slippage between the rider's feet and the foot deck 32. A rear wheel 44 is coupled to the foot deck 32 adjacent the aft end 40, and a rear fender 48 inhibits a rider's feet from contacting the rear wheel 44 directly when positioned atop of the foot deck 32. A joint plate 52 is secured at the fore end 36 of the foot deck 32, and has at least two position holes through which a locking bolt attached to a position knob 55 extends, with a first position hole 54a being shown. A corresponding locking nut enables securement of the locking bolt in the position holes. The head assembly 28 includes a head tube 56 coupled to a down tube 60. The head tube 56 receives a handlebar assembly 64 and a front wheel assembly 68. The handlebar assembly 64 includes a handlebar stem 72 connected to a pair of handlebar handles 76. The front wheel assembly 68 includes a front wheel 80. Where the foot-deck-based vehicle 20 is steerable via the handlebar handles, the handlebar assembly 64 can be directly coupled to the front wheel assembly 68 and rotatably received by the head tube 56.

The head assembly 28 is rotatably coupled to the joint plate 52 of the foot deck assembly 24 via a pivot bolt 84 that extends through the down tube 60 and the joint plate 52. The foot-deck-based vehicle 20 is shown in a riding configuration in FIG. 1A. In order to collapse the foot-deck-based vehicle 20 from the riding configuration to a collapsed configuration, the locking nut attached to the locking bolt is removed and the locking bolt is withdrawn from a second position hole. The head assembly 28 can then be rotated about the pivot bolt 84 to fold the handlebar assembly 64 towards the foot deck assembly 24.

FIG. 1B shows the foot-deck-based vehicle 20 in a collapsed configuration. The head assembly 28 has been folded down about the pivot bolt 84 towards the foot deck assembly 24. The second position hole 54b in which the locking bolt was secured is now exposed, and the locking bolt is secured in the first position hole 54a via the locking nut. As can be seen, in this collapsed configuration, the foot-deck-based vehicle 20 is more compact for storage and more readily portable.

There are a number of drawbacks with such designs for collapsing foot-deck-based vehicles. For example, the fasteners used to lock the position of the head assembly relative to the foot deck assembly can be difficult to secure tightly, causing the joint to rattle. Further, the structural integrity of the foot-deck-based vehicle can be weakened by the placement of the joint between the foot deck and the front wheel assembly. As a result, complex and/or large structural additions are made to the foot-deck-based vehicles.

SUMMARY OF THE DISCLOSURE

According to an aspect, there is provided a collapsing foot-deck-based vehicle, comprising a foot deck, at least two wheels coupled to the foot deck, and a handlebar assembly coupled to the foot deck via a pivot joint, the handlebar assembly comprising at least one handle, the locking pivot joint having a pivot axis that is generally unparallel with a horizontal plane defined by the lowermost surfaces of the at least two wheels, the handlebar assembly being selectively pivotable via the locking pivot joint between a riding configuration in which the handle is generally distal from the foot deck and a collapsed configuration in which the handle is generally proximal to the foot deck.

The pivot axis can be inclined between about 30 degrees and about 60 degrees from the horizontal plane.

The foot deck can comprise a generally planar portion, and a generally sloped portion extending from the generally planar portion at a fore end thereof.

The pivot joint can be positioned at the generally sloped portion of the foot deck.

The pivot joint can comprise a first locking face of the handlebar assembly that mates with a second locking face of the foot deck.

The pivot joint can further comprise a biasing member that exerts a biasing force in at least a pivot mode to bias the first locking face and the second locking face together, the biasing force being sufficiently weak to permit pivoting of the first locking face about the pivot axis relative to the second locking face when a threshold torque is applied to the handlebar assembly relative to the foot deck. The biasing member may form part of a locking mechanism that can lock the pivot joint in at least one position.

Each of the first locking face and the second locking face can comprise a pattern of protrusions projecting from a face plane at angular intervals around the pivot axis to which the face plane is orthogonal and defining an angular period.

The protrusions can extend radially.

The protrusions can be free of generally radially extending edges.

The locking mechanism can be conditioned to a locked mode in which the locking mechanism exerts a locking force to lock the patterns of protrusions of the locking faces of the handlebar assembly and the foot deck together, the locking force being sufficiently strong to inhibit rotation of the handlebar assembly about the pivot axis relative to the foot deck when a torque is applied to the handlebar assembly relative to the foot deck.

The locking mechanism can be conditioned to a locked mode in which the locking mechanism exerts a locking force to lock the first locking face and the second locking face together, the locking force being sufficiently strong to inhibit rotation of the handlebar assembly about the pivot axis relative to the foot deck when a torque is applied to the handlebar assembly relative to the foot deck.

The collapsing foot-deck-based vehicle can further comprise a first feature on the handlebar assembly, and a second feature on the foot deck limiting pivoting of the handlebar assembly relative to the foot deck.

One of the first feature and the second feature can comprise a protuberance, and wherein the other of the first feature and the second feature can comprise an arcuate slot dimensioned to receive the protuberance.

According to another aspect, there is provided a collapsing foot-deck-based vehicle, comprising a foot deck, at least two wheels coupled to the foot deck, each of said wheels having a rotation axis, and a handlebar assembly coupled to the foot deck via a locking pivot joint, the handlebar assembly comprising at least one handle, the locking pivot joint having a pivot axis that is generally unparallel to the rotation axes of the wheels, the handlebar assembly being selectively pivotable via the locking pivot joint between a riding configuration in which the handle is generally distal from the foot deck and a collapsed configuration in which the handle is generally proximal to the foot deck.

According to an aspect, there is provided a pivot joint including:

a first pivot member and a second pivot member, each of the first pivot member and the second pivot member having a locking face with a pattern of protrusions projecting from a face plane at angular intervals around a pivot axis to which the face plane is orthogonal and defining an angular period, each protrusion including:

a first surface region having an inclination angle relative to the face plane;

a second surface region having a declination angle relative to the face plane; and a third surface region extending at least about 10% of the angular period, the third surface region transitioning between the inclination angle and the declination angle and including an apex of the protrusion, the third surface region being free of planar portions that are substantially parallel to the face plane; and a biasing member exerting a biasing force in a pivot mode to bias the locking faces of the pivot members together, the biasing force being sufficiently weak to permit rotation of the first pivot member about the pivot axis relative to the second pivot member when a threshold torque is applied to the first pivot member relative to the second pivot member.

The protrusion can be free of surface regions having an inclination angle of more than about 60 degrees.

The protrusions can extend radially.

The pattern of protrusions of the first pivot member can complement the pattern of protrusions of the second pivot member.

The protrusions can be free of generally radially-extending edges.

The inclination angle can be generally equal in magnitude to the declination angle.

The biasing force can be a first biasing force, and the biasing member may be part of a biasing mechanism that can be conditioned to a locked mode in which the biasing mechanism exerts a second biasing force to bias the patterns of protrusions of the locking faces of the first pivot member and the second pivot member together, the biasing force being sufficiently strong to inhibit rotation of the first pivot member about the pivot axis relative to the second pivot member when a torque is applied to the first pivot member relative to the second pivot member.

According to another aspect, there is provided a quick release mechanism, including:

a frame including an aperture and a recess in the surface; and a quick release skewer including:

a tensioner member extending through the aperture;

an anchor member secured to a first end of the tensioner member; and a lever having a cam-shaped portion pivotally coupled to a second end of the tensioner member distal from the first end, and a lever portion extending from the cam-shaped portion for rotating the cam-shaped portion between a first orientation and a second orientation in which tension is increased on the tensioner, and at least one of the cam-shaped portion and the lever portion nests in the recess.

The lever portion can nest in the recess. The recess can be longer than the lever portion.

The cam-shaped portion can nest within the recess.

According to a further aspect, there is provided a pivot joint, including:

a first pivot member and a second pivot member, each of the first pivot member and the second pivot member having a locking face with a pattern of protrusions projecting from a face plane at angular intervals around a pivot axis to which the face plane is orthogonal and defining an angular period, each protrusion having a visible width between apexes of at least about three millimeters and at least about three millimeters in height relative to the face plane; and a biasing member exerting a biasing force in a pivot mode to bias the locking faces of the pivot members together.

The biasing force can be sufficiently weak to permit rotation of the first pivot member about the pivot axis relative to the second pivot member when a threshold torque is applied to the first pivot member relative to the second pivot member.

BRIEF DESCRIPTION OF THE DRAWINGS

Embodiments will now be described, by way of example only, with reference to the attached figures, wherein:

FIG. 15 is a plan view of the portion of the locking pivot joint that is shown in FIG. 13;

FIG. 16 is a plan view of the portion of the locking pivot joint that is shown in FIG. 14;

FIG. 17 is a magnified perspective view that is a portion of the foot-deck based vehicle shown in FIG. 10;

FIG. 18 is a magnified perspective view that is a portion of the foot-deck based vehicle shown in FIG. 9;

DETAILED DESCRIPTION OF EXAMPLE EMBODIMENTS

It is understood that the terms "couple", "coupled", "connect", "connected" are not limited to direct mating between the described components, but also contemplate the use of intermediate components to achieve the connection or coupling.

Figure 1A:
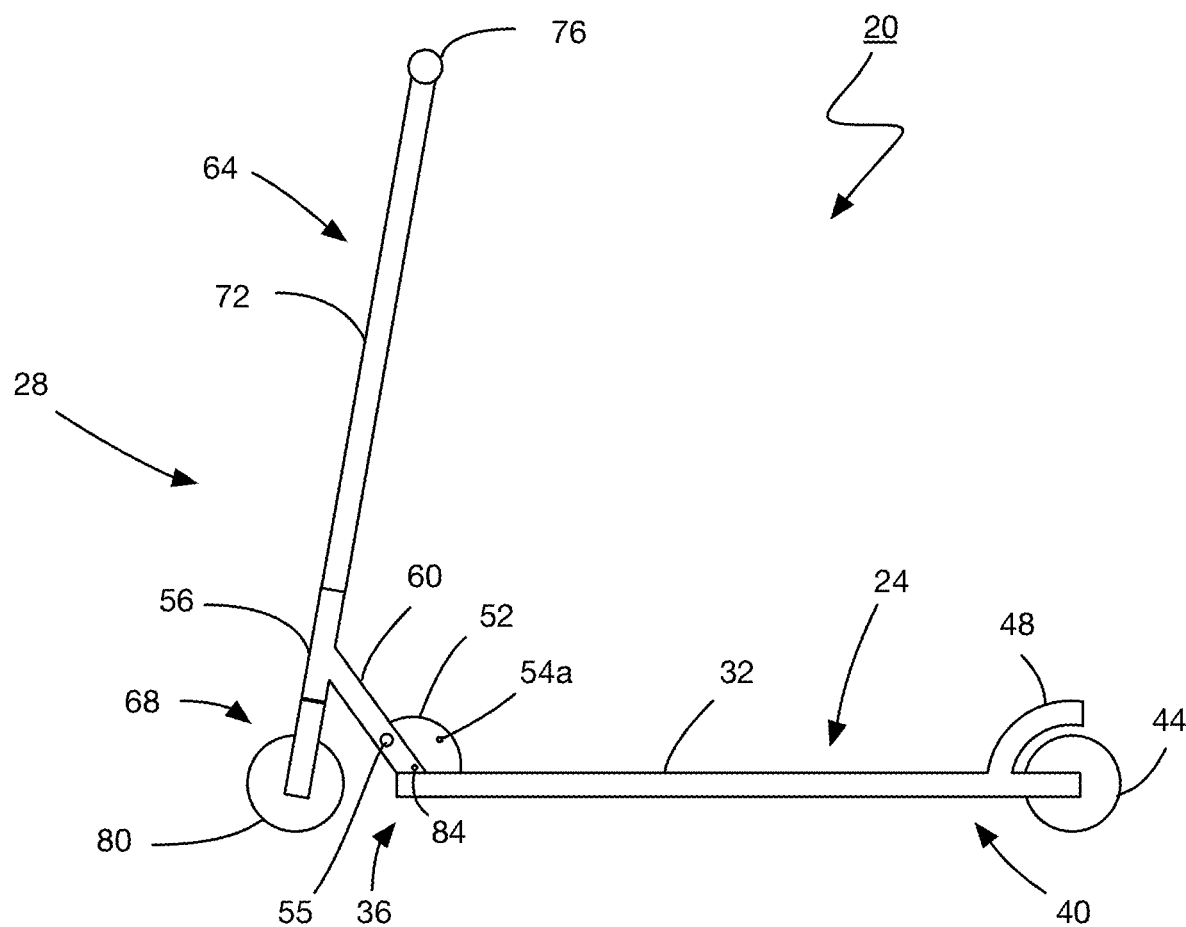
FIG. 1A is a side view of a prior art collapsible foot-deck-based vehicle in a riding configuration.
Figure 1B:
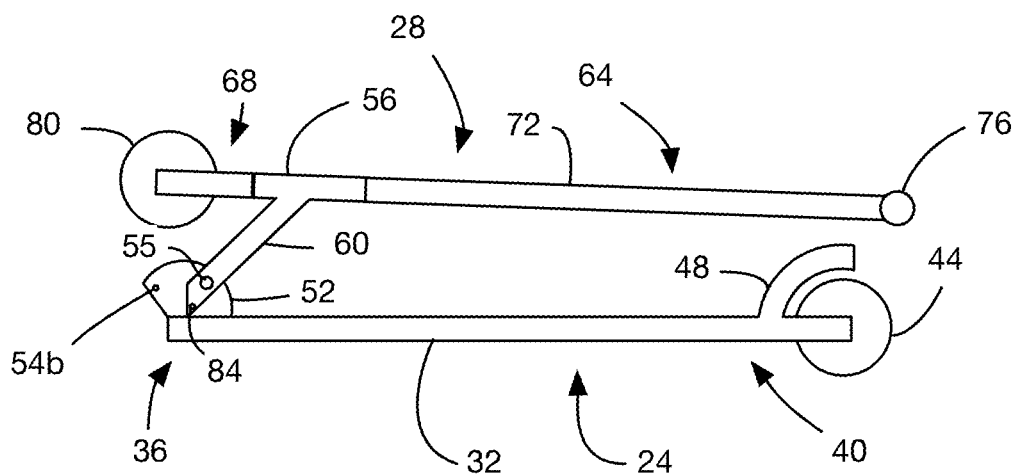
FIG. 1B is a side view of the prior art collapsible foot-deck-based vehicle of FIG. 1A in a collapsed configuration.
Figure 2:
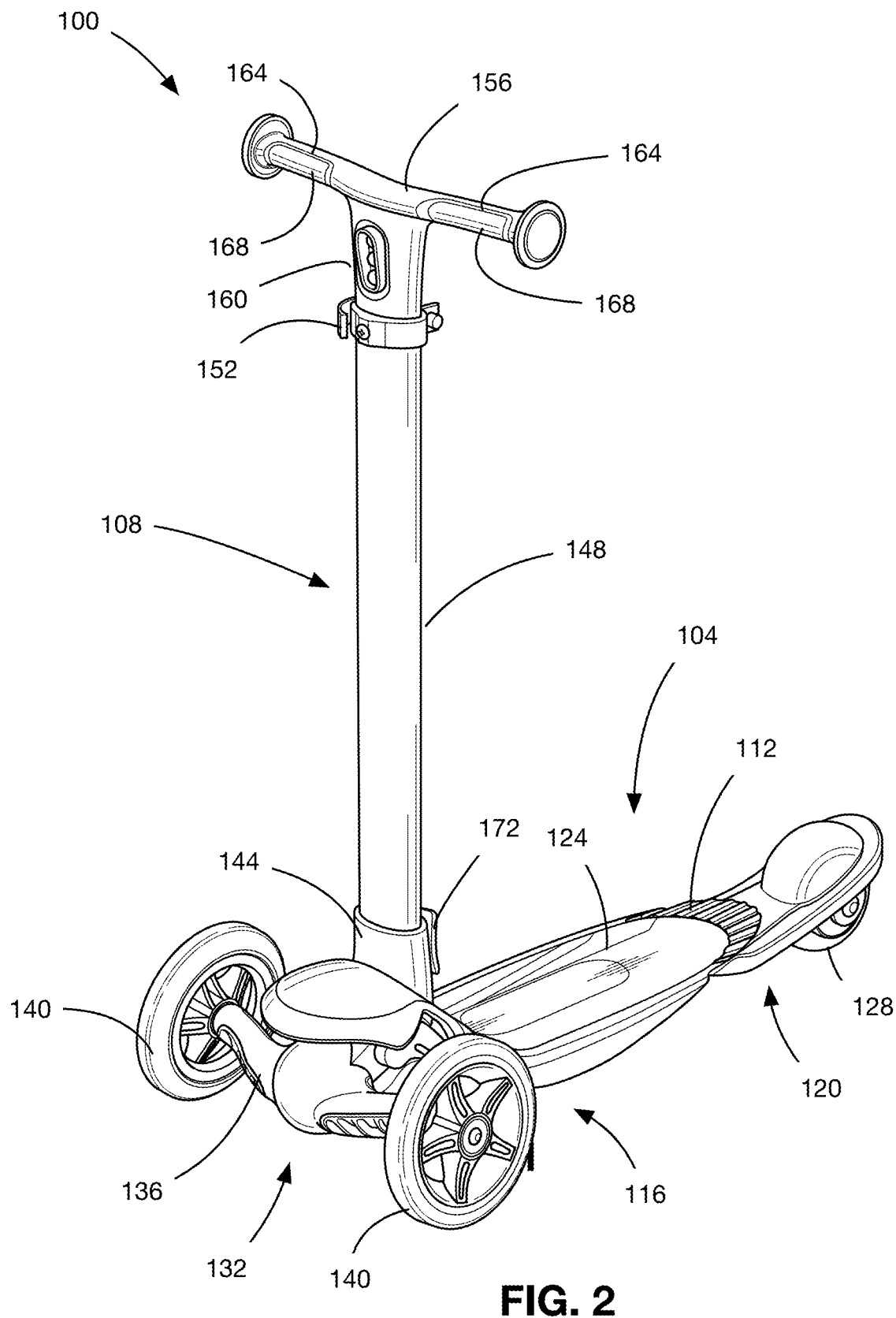
FIG. 2 is a front perspective view of a collapsible foot-deck-based vehicle having a locking pivot joint, in accordance with an embodiment of the present disclosure.

FIG. 2 depicts a collapsing foot-deck-based vehicle in accordance with an embodiment. In particular, the foot-deck-based vehicle is a three-wheeled scooter 100. Although the example foot-deck-based vehicle is depicted as a three-wheeled scooter, it is understood that the foot-deck-based vehicle is not limited to a scooter and may be any other foot-deck-based vehicle having a handlebar assembly. The scooter 100 includes a foot deck assembly 104 and a handlebar 108 (which may also be referred to as a handlebar assembly 108). The foot deck assembly 104 includes a foot deck 112 having a fore end 116 and an aft end 120 and a longitudinal axis A. The foot deck 112 has a generally flat upper surface 124 (referred to also as a foot support surface 124) upon which a rider's feet are positioned and may include a traction insert or surface adhesive to reduce slippage between the rider's feet and the foot deck 112. A rear wheel 128 is coupled to the foot deck 112 adjacent the aft end 120.

A front wheel assembly 132 of the foot deck assembly 104 is pivotably coupled to the foot deck 112 and includes a front wheel support 136 to which two front wheels 140 are freely rotatably secured.

The scooter 100 is a lean-to-steer type scooter, and the design of the front wheel assembly 132 and its connection with the foot deck 112 cause the scooter 100 to turn in a direction corresponding with a lateral side of the foot deck 112 to which a rider has shifted their weight. The front wheel assembly 132 includes a centering mechanism for biasing the front wheel assembly 132 to a neutral center position when the front wheel assembly 132 is pivoted to either side.

The rear wheel 128 and the front wheels 140 may be made of polyurethane and have rotation axes that are generally laterally and parallel to a flat surface upon which the scooter 100 is positioned.

The handlebar assembly 108 includes a handle support member 144 that has a tubular upper end. A handlebar stem 148 is friction fit and secured in the handle support member 144 at a first lower end thereof, such as via fasteners, bonding, etc. The handlebar stem 148 is also tubular and has a quick release clamp 152 at a second upper end thereof that secures a handlebar insert 156 via an elongated neck 160 thereof that is inserted into the second upper end of the handlebar stem 148 so that a pair of handlebar handles 164 of the handlebar insert 156 is fixed at a desired height from the flat upper surface 124 of the foot deck 112. The handlebar handles 164 have rubber inserts 168 to provide grip and comfort to a rider. The height of the handlebar handles 164 can be adjusted as desired to accommodate for the dimensions of a rider, the rider's preferences or other factors.

The handlebar assembly 108 is connected to the foot deck 112 via a locking pivot joint 171 that is selectively locked and unlocked via actuation of a quick release lever 172 (also referred to as a cam lock lever 172).

Figure 3:
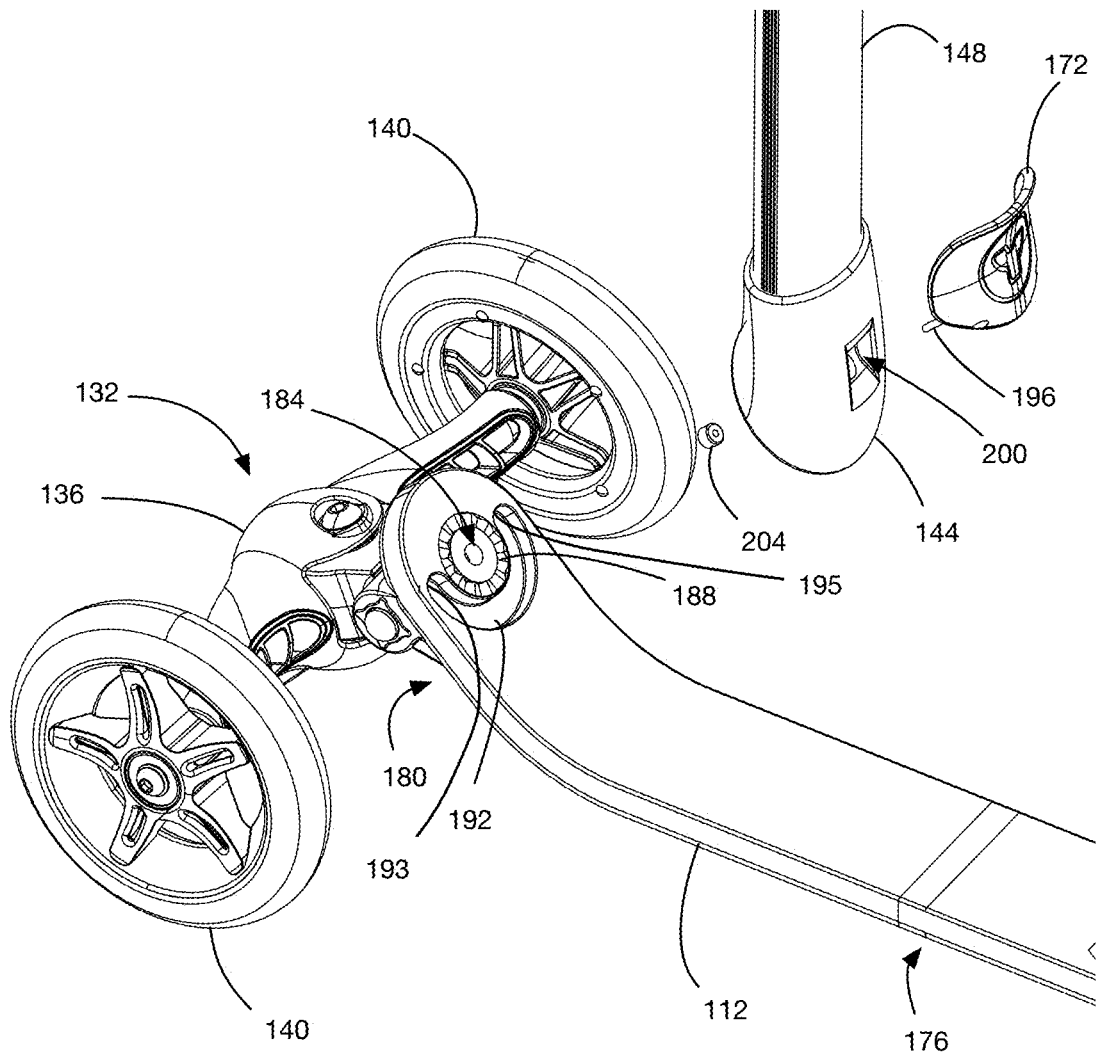
FIG. 3 is an exploded section view of the locking pivot joint of the scooter of FIG. 2.
Figure 4:
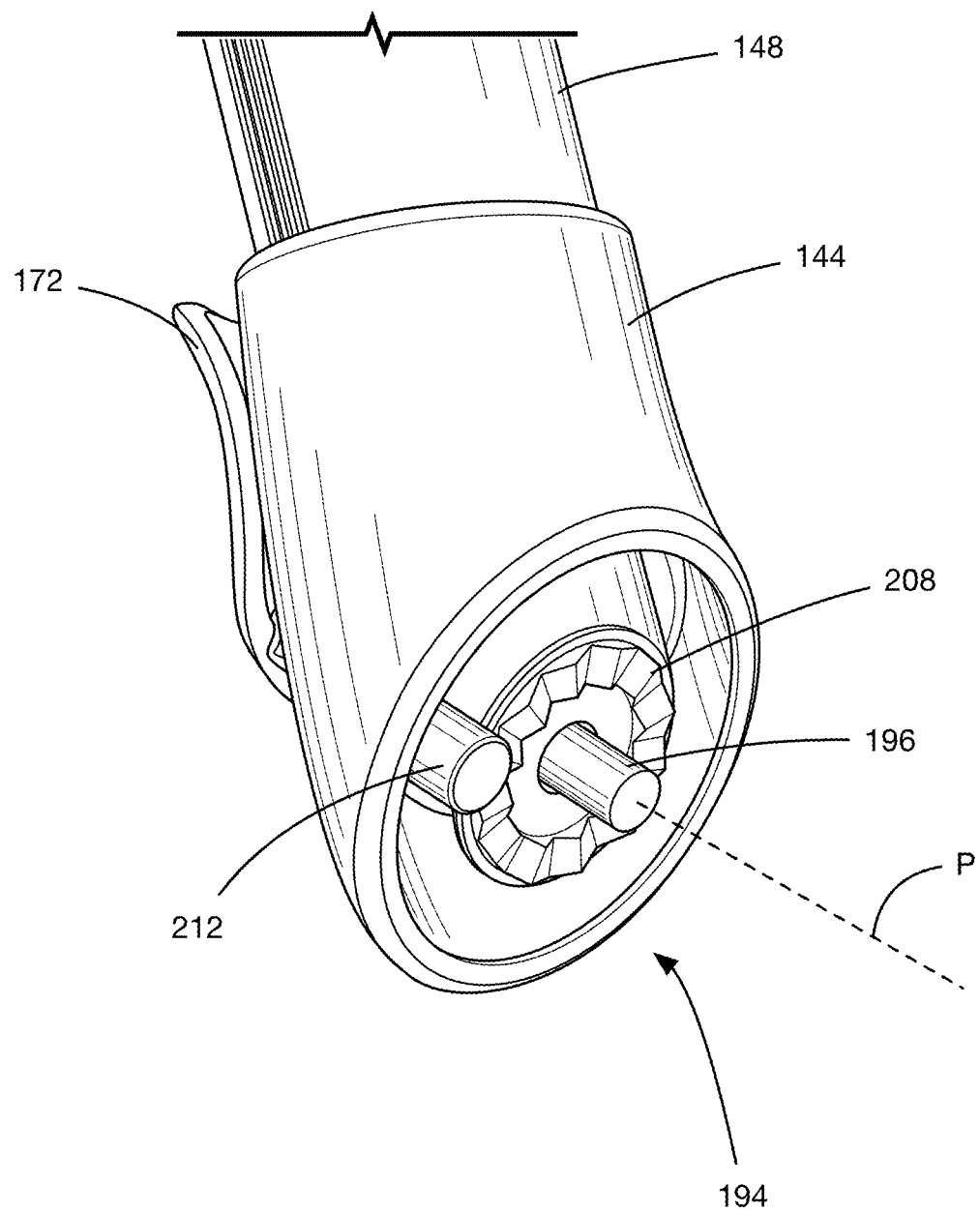
FIG. 4 is a bottom perspective view of a handle support member of FIG. 3.

FIGS. 3 and 4 show the various elements of the locking pivot joint in greater detail. The locking pivot joint 171 is positioned at a generally inclined portion of the foot deck 112. The foot deck 112 has a generally planar portion 176 which has the foot support surface 124 and a generally sloped portion 180 extending from the generally planar portion 176 at a fore end thereof. The generally sloped portion 180 is sloped relative to the generally planar portion 176. In the illustrated embodiment, the generally planar portion 176 is long relative to the generally sloped portion 180, as it is designed to support both feet, end to end, of a rider. Further, the generally sloped portion 180 slopes about 45 degrees from the generally planar portion 176, which is generally coplanar with a horizontal surface upon which the scooter 100 travels.

A pivot hole 184 extends through the generally sloped portion 180 of the foot deck 112. A locking face 188, which may optionally be annular, which is formed on a top surface of the generally sloped portion 180 of the foot deck 112, is proximate the pivot hole 184. An arcuate groove 192 extends about 180 degrees around the locking face 188.

The handle support member 144 has a diagonally sloped end face 194 at an angle of about 45 degrees. A tensioner member 196, (which may also be referred to herein as a tensioner rod 196 in embodiments wherein it is an elongate rod), is secured at one end to the quick release lever 172 and passes through a tensioner port 200 in the handle support member 144. The tensioner member 196 extends generally orthogonally from the slope of the lower end, through the pivot hole 184 in the generally sloped portion 180, and is secured at another end to a tensioner anchor 204. The quick release lever 172 is hingedly connected to the handle support member 144 and acts to tension or release tension from the tensioner member 196.

A locking face 208, (which may optionally be annular), and which corresponds with the locking face 188 of the generally sloped portion 180 of the foot deck 112, is disposed on the diagonally sloped end face 194 of the handle support member 144. A limiter post 212 protrudes orthogonally from the diagonally sloped end face 194 adjacent the locking face 208.

The locking face 188 of the generally sloped portion 180 of the foot deck 112 is substantially a mirror image of the locking face 208 of the handle support member 144.

Figure 5:
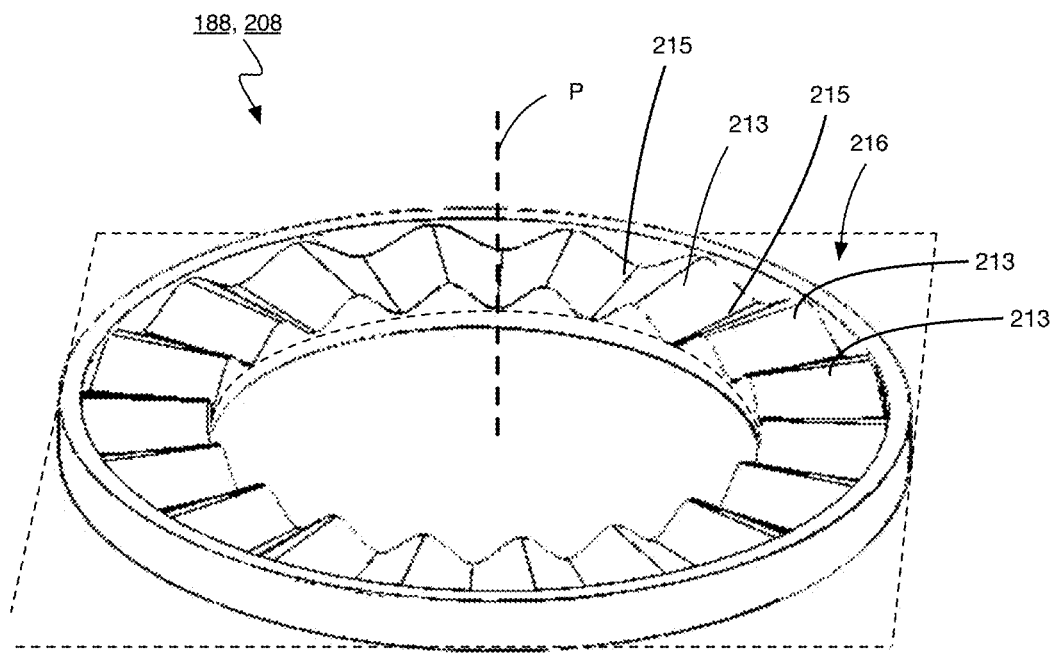
FIG. 5 is a side perspective view of a locking face of the locking pivot joint of FIG. 3.

FIG. 5 shows the locking faces 188 and 208 in greater detail. The locking faces 188 and 208 each have a plurality of protrusions 213 (which may also referred to as projections 213) that project from a face plane 216 at regular angular intervals around a pivot axis P, which is orthogonal to the face plane 216. The plurality of protrusions 213 in the embodiment shown are in the form of a regular pattern in which the protrusions 213 are all the same size and shape. The pattern of protrusions 213 is generally sinusoidal in profile along a circular path around the pivot axis P, with the protrusions 213 extending radially about the pivot axis P. The protrusions 213 are free of generally radially-extending edges, but may have radially-extending edges in other embodiments. The protrusions 213 may be said to alternate with a plurality of valleys shown at 215.

Figure 6A:
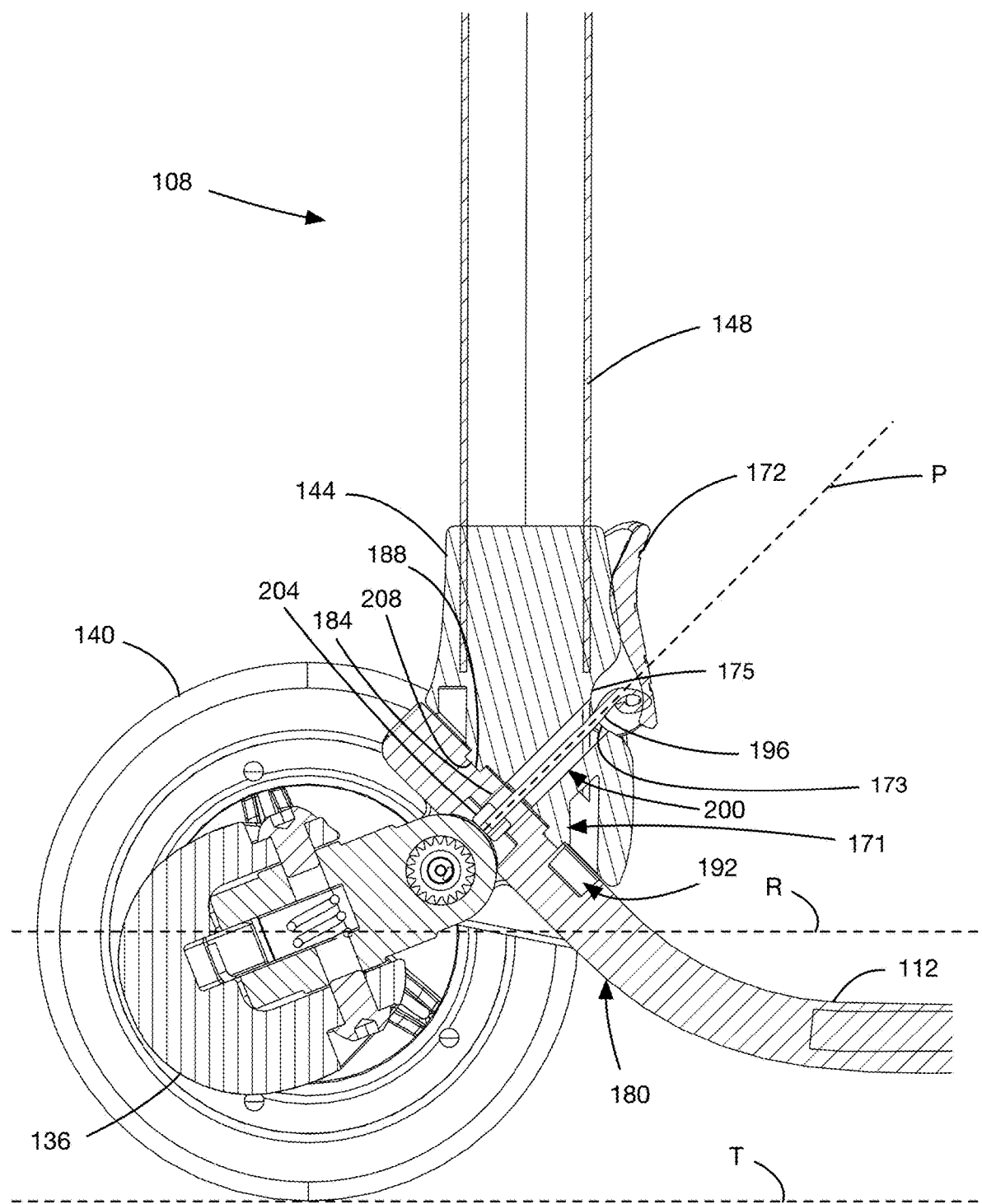
FIG. 6A is a partial side cross-section view of the locking pivot joint of FIG. 3 in a riding configuration, with a cam lock lever in a lock position.

Referring now to FIG. 6A, the pivot axis P in the scooter 100 is inclined about 45 degrees from the horizontal plane defined by the lower surfaces of the rear wheel 128 and the front wheels 140 of the scooter 100. As the main portion of the handlebar assembly 108 (mainly the handlebar stem 148) is generally straight, the handlebar assembly 108 can extend from the pivot axis P at a 45 degree angle to pivot between an upright riding configuration, in which the handlebar handles 164 are generally distal from the foot deck 112, and a generally horizontal collapsed configuration, in which the handlebar handles 164 are generally proximal to the foot deck 112.

The scooter 100 is shown in FIG. 6A assembled in a riding configuration, wherein the handlebar assembly 108 extends generally perpendicularly relative to the generally planar portion 176 of the foot deck 112. The locking pivot joint is locked in the riding configuration to prevent relative movement of the handlebar assembly 108 relative to the foot deck 112 during use. In particular, the diagonal sloped end face 194 of the handle support member 144 is positioned against the generally sloped portion 180 so that the tensioner port 200 of the handle support member 144 is aligned coaxially with the pivot hole 184 of the generally sloped portion 180 and the locking face 208 of the handle support member 144 is aligned and mated with the locking face 188 of the generally sloped portion 180. The tensioner member 196 extends from the quick release lever 172, through the tensioner port 200 and the pivot hole 184, and is secured via the tensioner anchor 204.

The quick release lever 172 has two modes (positions) in which it can be conditioned (positioned). When the quick release lever 172 is in a lock position (FIGS. 6A and 7), a locking portion of the cam surface shown at 173 on the quick release lever 172 engages a cam surface engagement surface 175 on the handle support member 144, which pulls the tensioner member 196. The pulling causes a clamping force to be applied between the tensioner anchor 204 and the cam surface 173 clamping force to hold the handle support member 144 and the generally sloped portion 180 of the foot deck 112 tightly against one another, and to hold the protrusions of the locking face 188 in tight engagement with the valleys of the locking face 208 and the protrusions of the locking face 208 in tight engagement with the valleys of the locking face 188, thereby preventing the locking faces 188 and 208 to be separated as required to pivot the handlebar assembly 108 relative to the foot deck assembly 104.

Figure 6B:
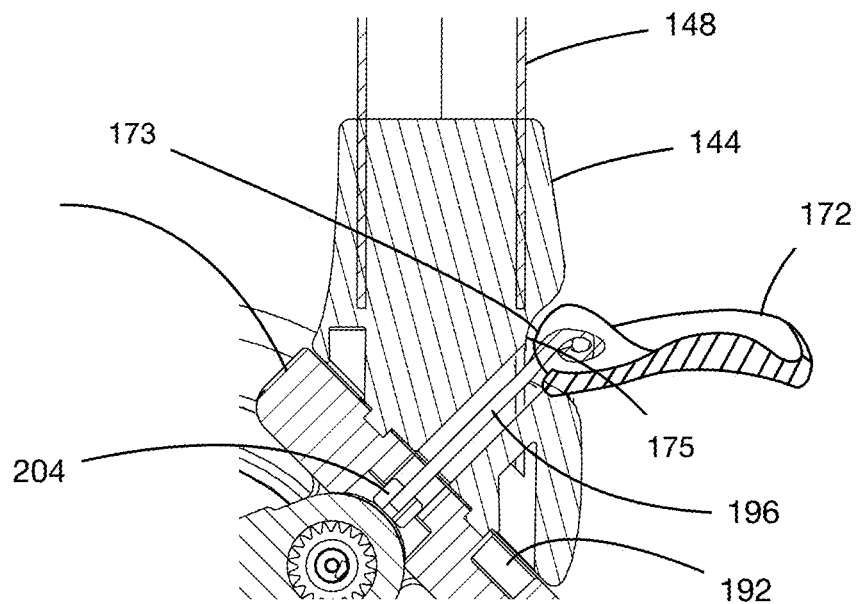
FIG. 6B is a side cross-section view of the cam lock lever in a release position.

When it is desired to collapse the scooter 100, the quick release lever 172 can be actuated to a pivot position, also referred to as a release position, (shown in FIG. 6B), thus applying a lesser tension along the tensioner member 196 (optionally zero tension), and thus a lesser tension force (optionally, no tension force) urging the locking face 188 of the generally sloped portion 180 of the foot deck 112 and the locking face 208 of the handle support member 144 together. In this mode or position, tension is sufficiently low to permit the locking faces 188 and 208 to be separated sufficiently to pivot the locking face 188 relative to the locking face 208 and thus to pivot the handlebar assembly 108 relative to the foot deck assembly 104. The handlebar assembly 108 may thus be pivoted from the use position to the collapsed position. If the separation of the locking faces 188 and 208 is not great enough there will still be some interference between the peaks of the protrusions 213 as they pass over one another during pivoting of the locking face 188 and the handlebar assembly 108. Thus, in such embodiments, such pivoting may require application of a threshold torque by the user on the handlebar assembly 108. The threshold torque is sufficient to rotate the locking face 208 of the handle support member 144 relative to the locking face 188 of the generally sloped portion 180 of the foot deck 112, thus overcoming the remaining tension force exerted by the tensioner member 196 that exists when the peaks pass over one another, and any friction between them.

Figure 7:
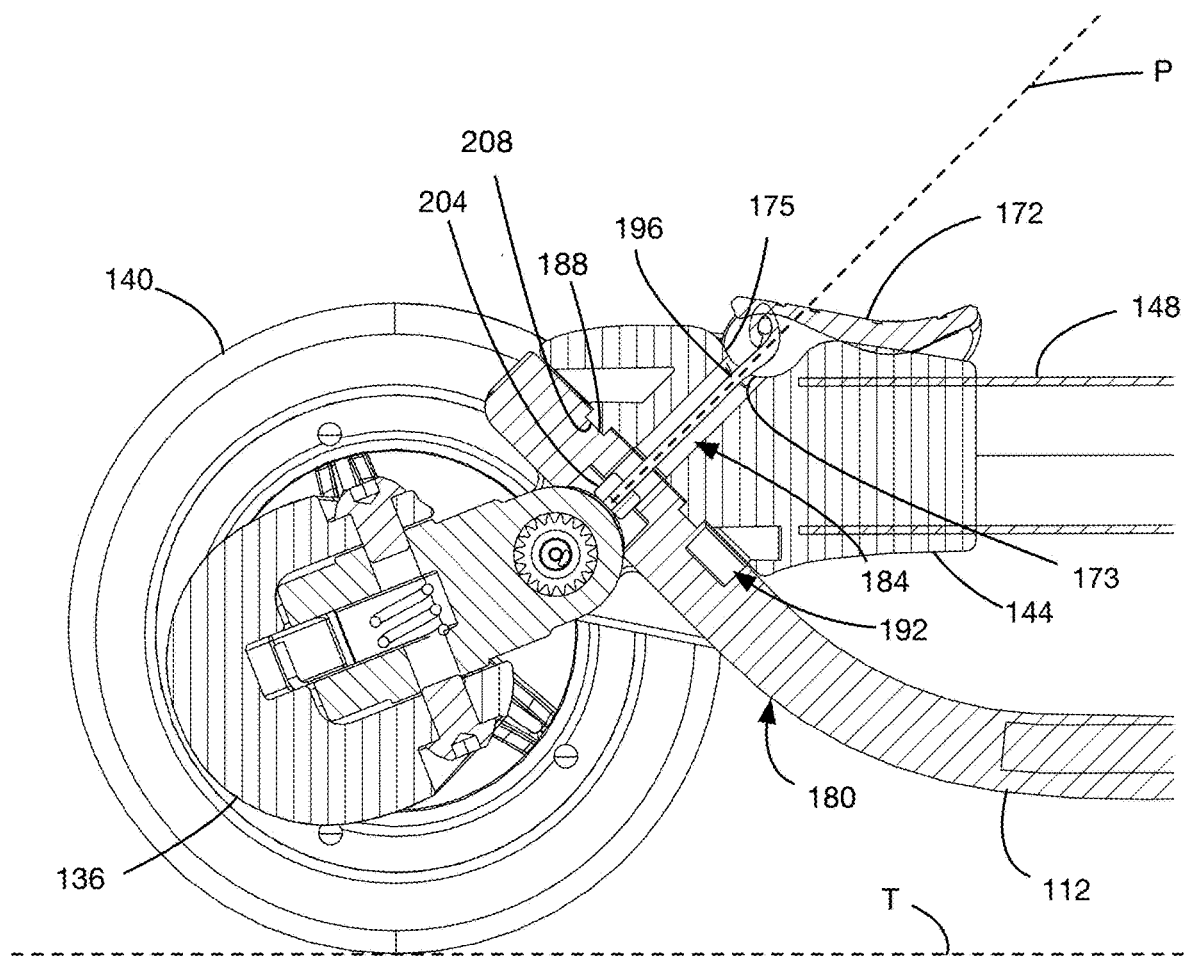
FIG. 7 is a partial side cross-section view of the locking pivot joint of FIG. 3 in a collapsed configuration.

Thus, the handlebar assembly 108 can be pivoted from its riding position shown in FIG. 6A to a collapsed position shown in FIG. 7. The limiter post 212 of the handle support member 144 is at one end of the arcuate groove 192 in the generally sloped portion 180 when the handlebar assembly 108 is in a riding configuration. As the handlebar assembly 108 is pivoted relative to the foot deck assembly 104, the limiter post 212 travels along the arcuate groove 192 and is limited from traveling past the collapsed position by a first end wall 193 of the arcuate groove 192, thus facilitating pivoting of the handlebar assembly 108 to the collapsed configuration/position. The aforementioned first end wall 193 of the groove 192 may also be referred to as a first limit surface 193.

Once the handlebar assembly 108 is in the collapsed position, the cam lock lever 172 can be moved to the lock position such that the cam surface 173 on the cam lock lever 172 and the tensioner anchor 204 apply the clamping force to the locking faces 188 and 208 so as to lock the handlebar assembly 108 in the collapsed position.

As the handlebar assembly 108 is pivoted in the opposite direction, relative to the foot deck assembly 104, the limiter post 212 travels in the opposite direction along the arcuate groove 192 (i.e. away from the end wall 193) and is limited from traveling past the use position by a second end wall 195 of the arcuate groove 192, thus facilitating pivoting of the handlebar assembly 108 to the use configuration/position. The aforementioned second end wall 194 may also be referred to as a second limit surface 194.

FIG. 7 shows the scooter 100 in a collapsed configuration after pivoting of the handlebar assembly 108. As shown, pivoting of the handlebar assembly 108 about the pivot axis P results in the handlebar assembly 108 being generally parallel to the generally planar portion 176 of the foot deck 112, and, although not shown, proximal positioning of the handlebar handles 164.

While the foot deck of the vehicles in the above-described embodiments are generally long, narrow boards extending along the fore-aft axis, other shapes and sizes can be used. For example, the handlebar assembly arrangements can be adapted for use with foot-deck-based vehicles with Y-shaped foot decks.

The angle of inclination between the pivot axis and the horizontal plane defined by the lower surfaces of the wheels of the scooter which a foot-deck-based vehicle travels can be varied. It has been generally found that angles of inclination between about 30 degrees and about 60 degrees from horizontal enable suitable rotation of a handlebar assembly between a riding configuration and a collapsed configuration. Modifications to the handlebar assembly, such as a curved or bent handlebar assembly, may or may not vary these results.

The handlebar assembly may be varied from that described with reference to certain embodiments above. For example, the handlebar handles may be replaced with other types of handles, such as a single handlebar or handle loop, ball, etc.

Other methods and mechanisms that lock the orientation of the handlebar assembly relative to the foot deck can be employed. For example, a winged nut mounted atop of a threaded bolt can apply sufficient locking force on the pivot joint to suppress undesired pivoting of the handlebar assembly during use or carriage.

Other mechanisms that can exert a biasing force in a pivot mode to bias the locking faces together, wherein the biasing force is sufficiently weak to permit rotation of the locking faces about the pivot axis relative to each other when a threshold torque is applied to the handlebar assembly relative to the foot deck. For example, helical coil or other springs, and/or electromagnets can be employed in place of or in addition to the tensioner member.

The foot deck can comprise posts, platforms, contours, extensions, and the like to differently angle, elevate, or sink the pivot joint relative to the foot deck.

Various configurations of locking faces can be employed. For example, one or both of the locking faces can be fitted with surfaces that are generally planar but have high coefficients of friction.

Various suitable features can be employed to facilitate the correct orientation of the handlebar assembly relative to the foot deck. For example, an external tab on the handlebar assembly can be limited to a certain range of pivoting about the pivot axis by corresponding features of the foot deck. In other embodiments, visual, audio, and or haptic feedback can be provided to a person to indicate that a correct orientation of the handlebar assembly relative to the foot deck has been achieved.

The term 'pivot' and related terms (e.g. 'pivoting', 'pivoted') have been used to describe the movement of the handlebar assembly 108 and the structure that permits said movement. While the term 'pivot' and the related terms are correct, the term 'swivel' and its related terms could also be used to describe the movement and the structure that permits the movement. Thus, the locking pivot joint referred to herein may also be referred to as a locking swivel joint. Similarly, the pivot hole 184 and the pivot axis P may alternatively be referred to as the swivel hole 184 and the swivel axis P. Any reference to swivel or related words within the present disclosure could be replace with the term 'swivel'.

The locking face 188 may be referred to as the first locking face and the locking face 208 may be referred to as the second locking face 208. Alternatively, the locking face 208 may be referred to as the first locking face and the locking face 188 may be referred to as the second locking face.

Furthermore, the locking faces 188 and 208 may alternatively be referred to as engagement surfaces 188 and 208. Thus, either of the locking faces 188 or 208 may be referred to as the first engagement surface 188 or 208 as the case may be, and the other of the locking faces 188 or 208 may be referred to as the second engagement surface 188 or 208.

Figure 8A:
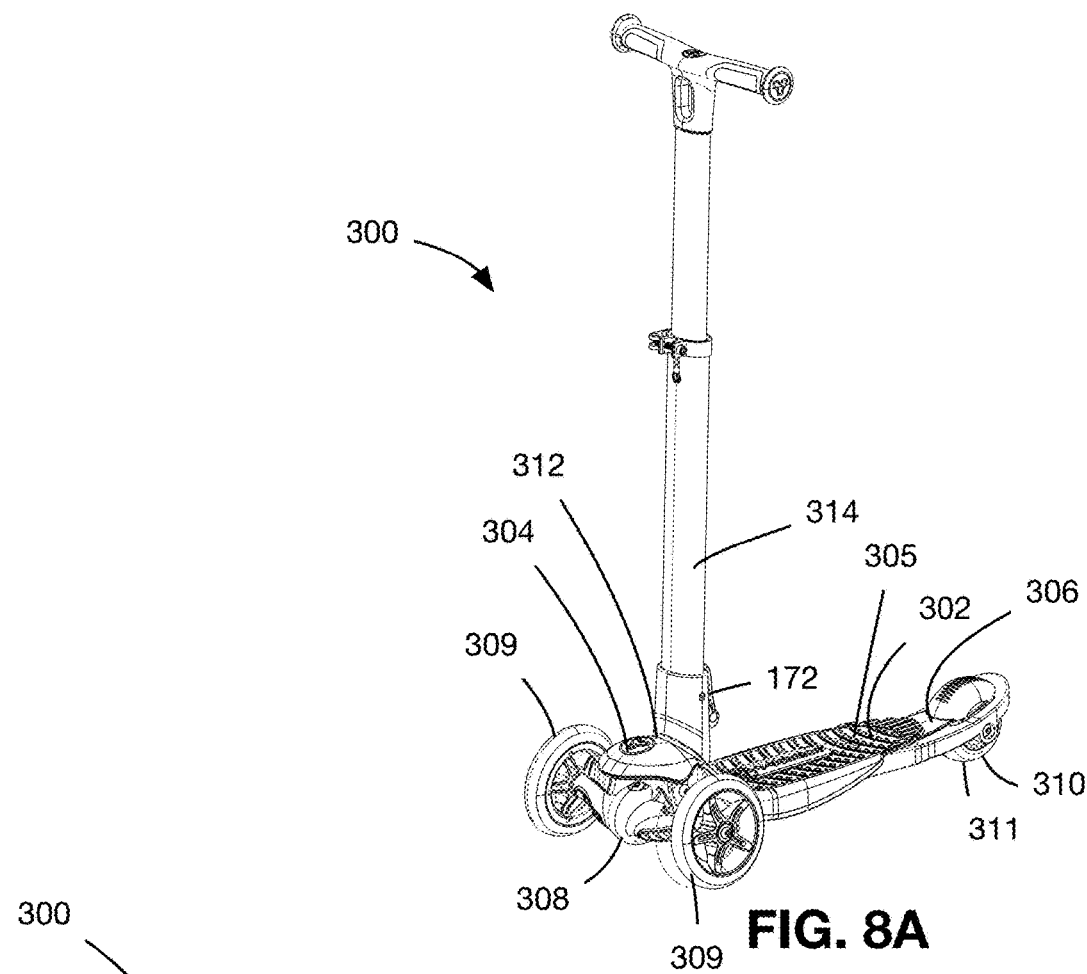
FIG. 8A is a perspective view of another collapsible foot-deck based vehicle in a riding configuration having a locking pivot joint, in accordance with another embodiment of the present disclosure.
Figure 8B:
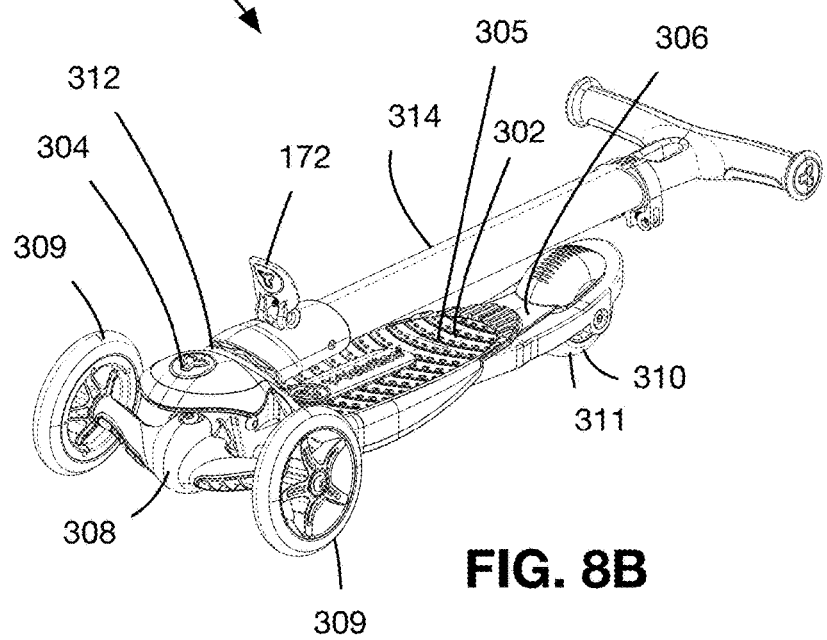
FIG. 8B is a perspective view of the collapsible foot-deck based vehicle shown in FIG. 8A in a collapsed configuration.
Figure 9:
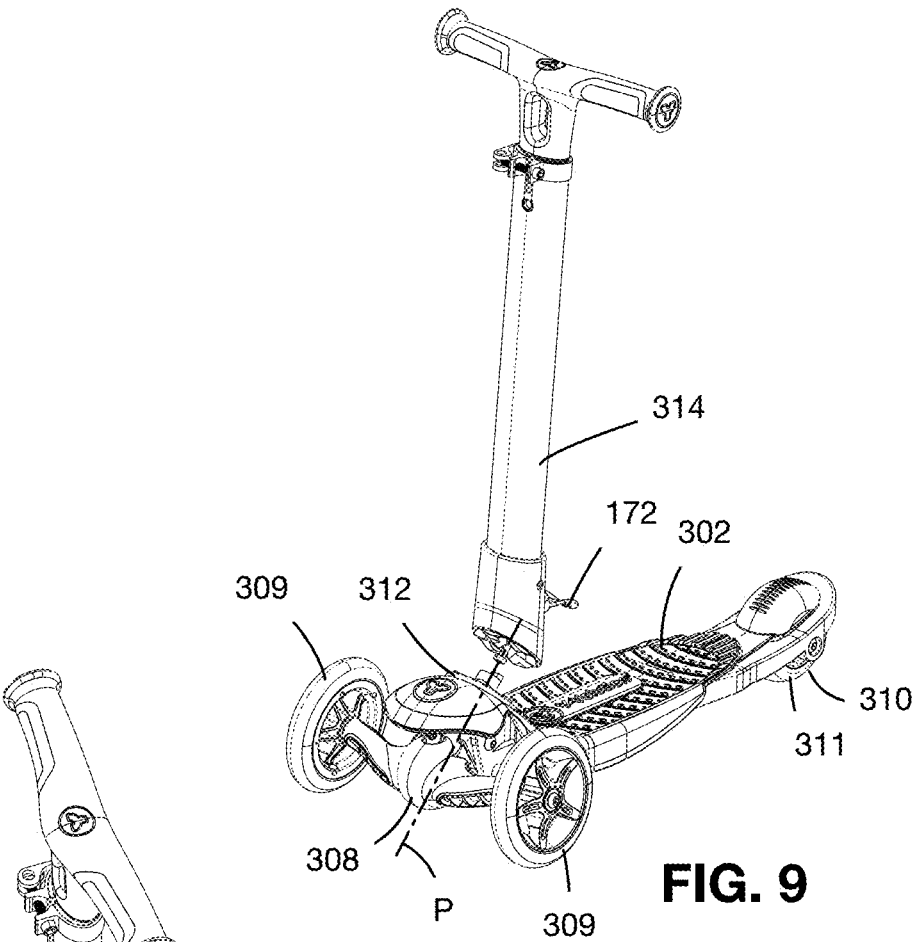
FIGS. 9 and 10 are perspective partially exploded views of the collapsible foot-deck based vehicle shown in FIG. 8A.
Figure 10:
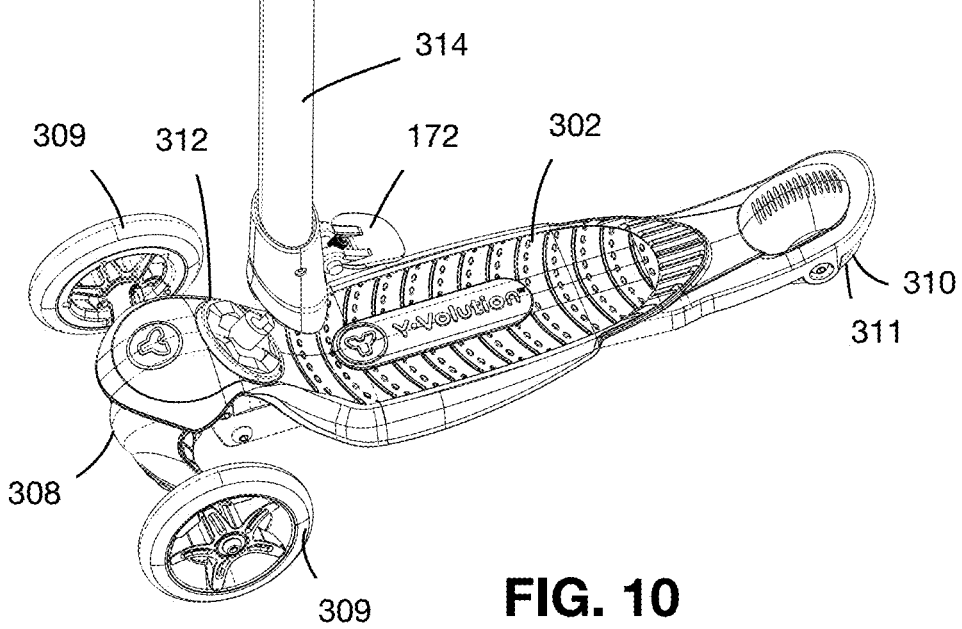

Reference is made to FIGS. 8A and 8B which show a foot deck based vehicle 300 that may be similar to the foot deck based vehicle 100 and which includes a foot deck 302 having a front end 304 (also referred as a fore end 304) and a rear end 306 (also referred to as an aft end 306) and a foot support surface 305, a front wheel assembly 308 with front wheels 309 that may be similar to the front wheel assembly 132 and which is mounted at the front end 304 of the foot deck 302 and a rear wheel assembly 310 with a rear wheel 311 that may be similar to the rear wheel 44 and which is mounted at the rear end 306 of the foot deck 302. The vehicle 300 further includes a handlebar mount 312 on the foot deck 302 and a handlebar 314 (also referred to as a handlebar assembly 314) that may be similar to the handlebar assembly 108) and which extends up from the handlebar mount 312.

The handlebar mount 312 defines a handlebar pivot axis P. The handlebar 314 is precessively pivotable about the handlebar pivot axis P between a use position (FIG. 8A) and a collapsed position, also referred to as a storage position (FIG. 8B). The handlebar 314 extends farther away from the foot deck 302 in the use position than in the storage position. Optionally, the handlebar 314 extends approximately perpendicular to the foot support surface 305 when in the use position and is approximately parallel to the foot support surface 305 when in the storage position.

Figure 11:
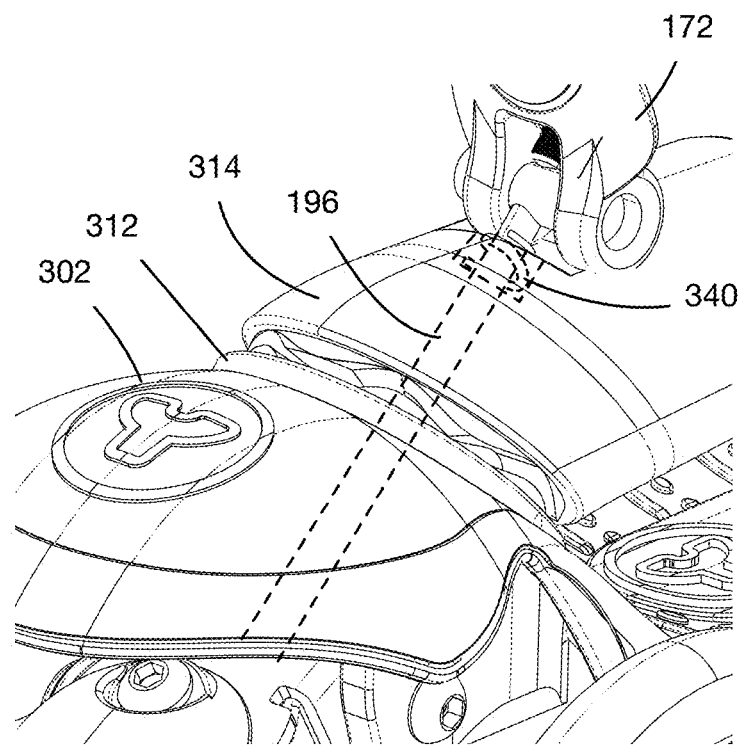
FIG. 11 is a magnified perspective view of the locking pivot joint shown in FIG. 8A in a transitional position.
Figure 12:
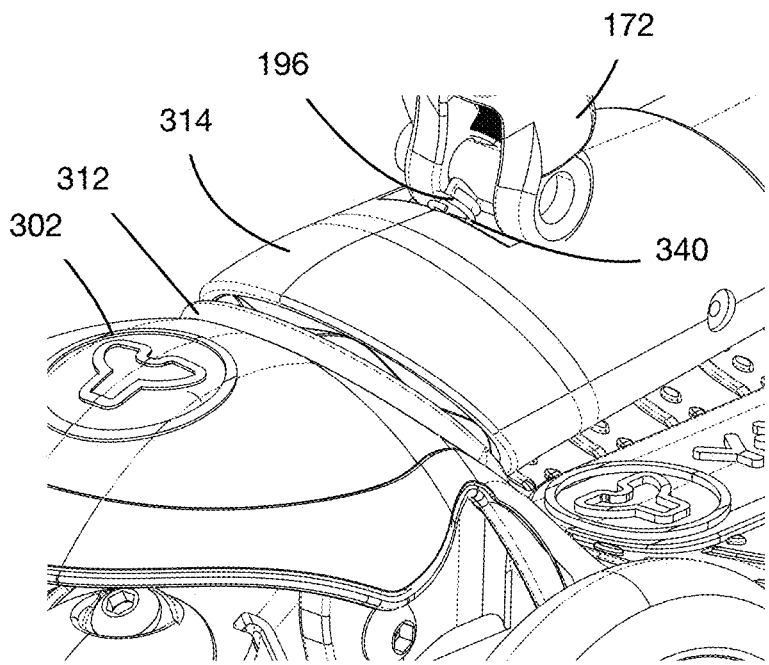
FIG. 12 is a magnified perspective view of the locking pivot joint shown in FIG. 8A in an end position.
Figure 13:
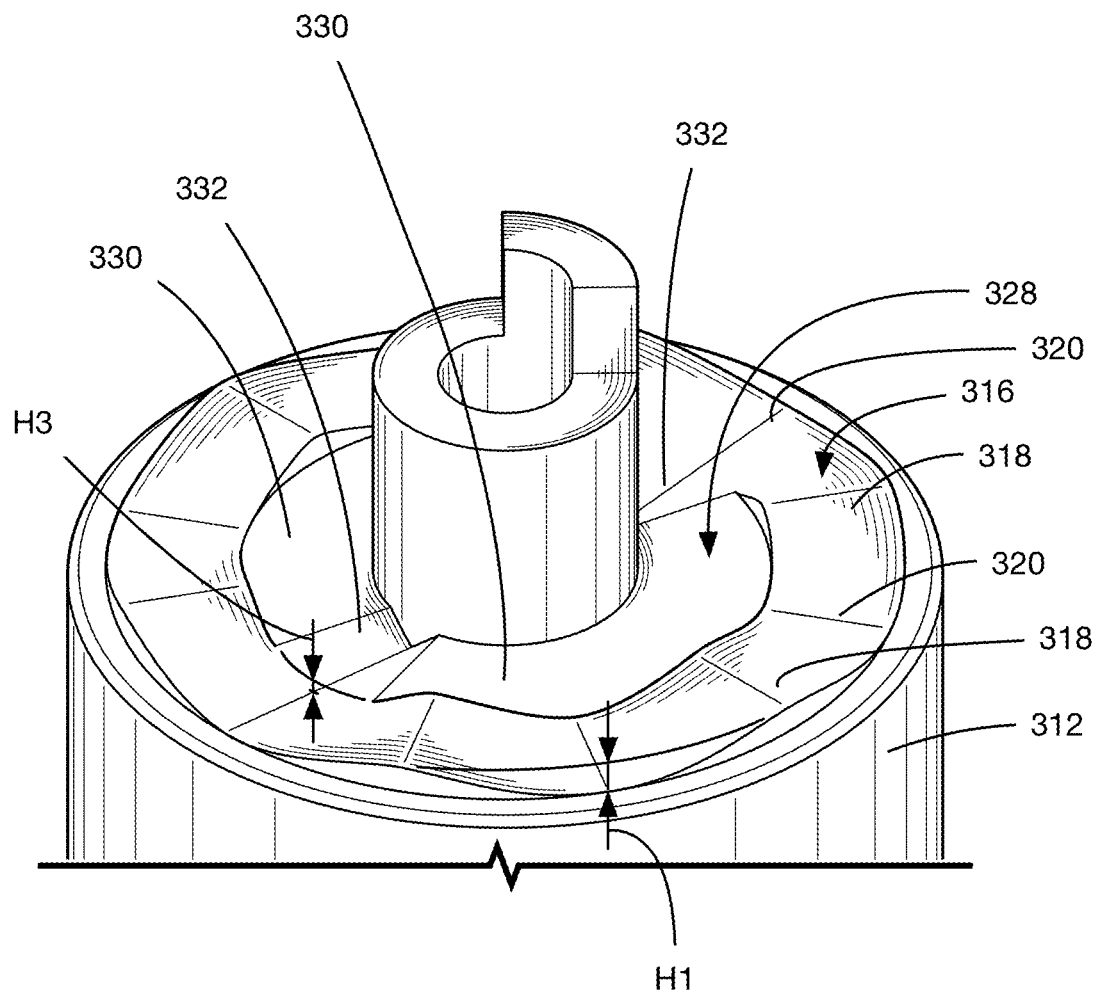
FIG. 13 is a magnified perspective view of a portion of the locking pivot joint that is shown in FIG. 11.
Figure 14:
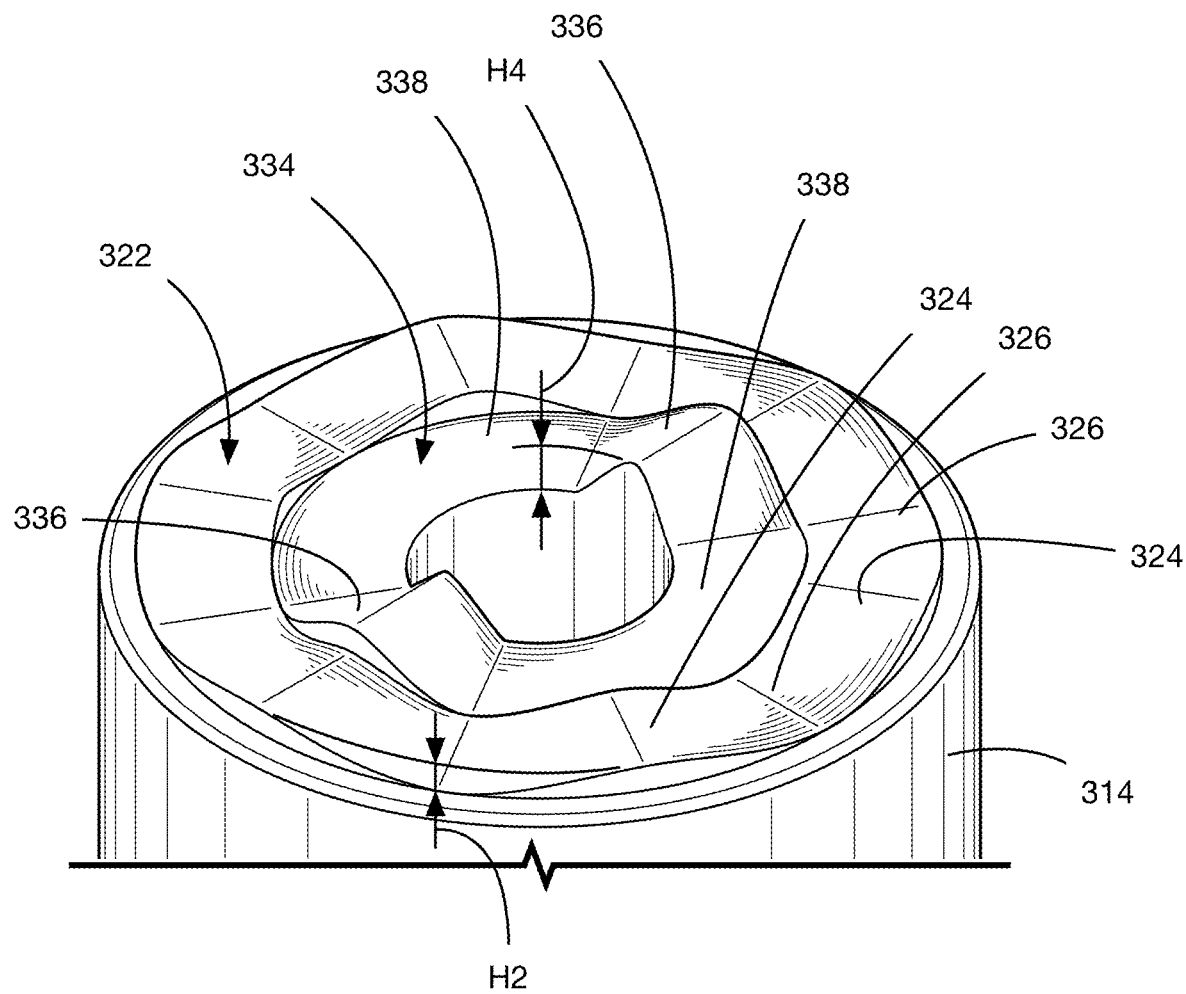
FIG. 14 is a magnified perspective view of another portion of the locking pivot joint that is shown in FIG. 11.

The handlebar mount 312 has a first handlebar mount engagement surface 316 (also shown in plan view in FIG. 16) extending circumferentially about the handlebar pivot axis P and having a first plurality of handlebar mount projections 318 which alternate with a first plurality of handlebar mount valleys 320. An axial height H1 (FIG. 13) of the first plurality of handlebar mount projections 318 above the first plurality of handlebar mount valleys 320 is a first height. The handlebar 314 has a first handlebar engagement surface 322 (also shown in plan view in FIG. 15) extending circumferentially about the handlebar pivot axis P and having a first plurality of handlebar projections 324 which alternate with a first plurality of handlebar valleys 326. An axial height H2 (FIG. 14) of the first plurality of handlebar projections 324 above the first plurality of handlebar valleys 326 is a second height. The handlebar mount 312 has a second handlebar mount engagement surface 328 (also shown in plan view in FIG. 16) extending circumferentially about the handlebar pivot axis P and having a second plurality of handlebar mount projections 330 which alternate with a second plurality of handlebar mount valleys 332. An axial height H3 (FIG. 13) of the second plurality of handlebar mount projections 330 above the second plurality of handlebar mount valleys 332 is a third height. The handlebar 314 has a second handlebar engagement surface 334 extending circumferentially about the handlebar pivot axis P and having a second plurality of handlebar projections 336 which alternate with a second plurality of handlebar valleys 338. An axial height H4 (FIG. 14) of the second plurality of handlebar projections 336 above the second plurality of handlebar valleys 338 is a fourth height. Referring to FIGS. 11 and 12, a handlebar biasing member, which may be, for example, a helical coil compression spring 340 on the tensioner rod 196, urges the first and second handlebar engagement surfaces 322 and 334 axially towards engagement with the first and second handlebar mount engagement surfaces 316 and 328 respectively.

When the two wave-shaped surfaces shown in FIGS. 2-7 pass over each other (e.g. during swiveling of the handlebar assembly 108), the projections repeatedly ride over one another and then ride down into the adjacent valleys. This can be annoying to a rider who wants to move the handlebar quickly and easily between the use and storage positions. The amount of axial movement that arises when the handlebar assembly 108 is being swiveled or pivoted between the use and storage positions is based on the lesser of the heights between the projections and the valleys on the mutually engaged wave-shaped surfaces. For example if one surface has a height of 3 mm and the other surface has a height of 5 mm, then when the wave-shaped surfaces ride over one another, the handlebar assembly will only move axially by 3 mm (the lesser of the two heights). Thus the lesser of the two heights determines the amount of axial movement that the handlebar assembly 108 will incur during swiveling (or in any two mutually engaged wave-shaped surfaces). In order to eliminate the repeated riding of projection on projection and subsequent decent into the adjacent valley during pivoting between the use and storage positions, the handlebar 314 and the handlebar mount 312 are provided with the second engagement surfaces 328 and 334, which, when engaged projection to projection substantially prevent the projections on the first engagement surfaces 316 and 322 from engagement with one another. This may be characterized by configured the surfaces 316, 322, 328 and 334 such that a lesser of the third and fourth heights H3 and H4 is greater than a lesser of the first and second heights. In an example, the heights H3 and H4 may both be about 6 mm and the heights H1 and H2 may both be about 3 mm.

Additionally, it will be noted that the number of 'clicks' (ascents to projection to projection engagement and subsequent descents of projection to valley engagement), that occurs during pivoting is dependent on the number of projections and valleys two mutually engaged surfaces have, and more specifically on the number projections and valleys on whichever of the mutually engaged surfaces has more projections. In the present example, the two first engagement surfaces 316 and 322 both have 6 projections and 6 valleys. By configuring the second engagement surfaces 328 and 334 and the first engagement surfaces 316 and 322 such that the greater number of projections on the first surfaces 316 and 322 is greater than the greater number of projections on the second surfaces 328 and 334, there are fewer 'clicks' when pivoting than there would be if the second engagement surfaces 328 and 334 were not present. Worded another way, the greater of the number of first handlebar projections 324 and the number of first handlebar mount projections 318 is greater than a greater of the number of second handlebar projections 336 and the number of second handlebar mount projections 330. In at least some embodiments, the greater of the number of first handlebar projections 324 and the number of first handlebar mount projections 318 is a multiple of the greater of the number of second handlebar projections 334 and the number of second handlebar mount projections 328. In an example, there may be six first handlebar projections 324 and handlebar mount projections 318 and two second handlebar projections 334 and handlebar mount projections 328.

Preferably, at least one of the second handlebar or handlebar mount projections is generally flat has a constant axial height over a selected angular range. In the present example, the second handlebar mount projections 330 are generally flat axially over an angular range of about 150 degrees.

At the use and storage positions, the first handlebar projections 324 engage the first handlebar mount valleys 320 and the second handlebar projections 334 engage the second handlebar mount valleys 330.

During pivoting of the handlebar 314 between the use and storage positions, engagement of the second handlebar projections 334 with the second handlebar mount projections 328 substantially prevents engagement of the first handlebar projections 324 with the first handlebar mount projections 318.

The engagement surfaces 316, 322, 328 and 334, and the tensioner rod 196 and biasing member 340 that urge the engagement surfaces into engagement with one another constitute a pivot joint 342 for the vehicle 300. The pivot joint 342 optionally includes the quick release lever 172 and other associated structure (e.g. the tensioner member 196 and the tensioner anchor 204) which together forms a cam locking structure, thereby providing the pivot joint 300 with locking capability so that it is a locking pivot joint. In some embodiments, however, the pivot joint 342 does not include the quick release lever 172, but does include a biasing member 340 and the tensioner member 196 (if needed for biasing) so as to apply a biasing force that urges the surfaces 316, 322, 328 and 334 into engagement with one another to inhibit the handlebar 314 from pivoting out of the use position during use.

Furthermore, the pivot joint 342 is shown as being incorporated into a foot-deck based vehicle. However, it will be understood that the pivot joint 342 may be incorporated into any other device where it is beneficial to do so. The handlebar mount 312 described above may more broadly be referred to as a first pivotable member 312, and the handlebar 314 may more broadly be referred to as a second pivotable member 314. The pivot joint 342 may be used to permit the first pivotable member 312 to be pivoted between a first pivot joint position (e.g. the position shown in FIG. 8A) and a second pivot joint position (e.g. the position shown in FIG. 8B). The first handlebar mount engagement surface 316 may thus be referred to as a first pivotable member first engagement surface 316 or alternatively a first engagement surface 316 of the first pivotable member 312, which has a first plurality of first pivotable member projections 318 which alternate with a first plurality of first pivotable member valleys 320. An axial height H1 (FIG. 13) of the first plurality of first pivotable member projections 318 above the first plurality of first pivotable member valleys 320 is a first height. The second pivotable member 314 has a second pivotable member first engagement surface 322, which may also be referred to as a first engagement surface 322 of the second pivotable member 314, extending circumferentially about the pivot axis P for the second pivotable member 314, and having a first plurality of second pivotable member projections 324 which alternate with a first plurality of second pivotable member valleys 326. An axial height H2 (FIG. 14) of the first plurality of second pivotable member projections 324 above the first plurality of second pivotable member valleys 326 is a second height.

The first pivotable member 312 has a first pivotable member second engagement surface 328, which may also be referred to as a second engagement surface of the first pivotable member 312, which extends circumferentially about the pivot axis P and which has a second plurality of first pivotable member projections 330 which alternate with a second plurality of first pivotable member valleys 332. An axial height H3 (FIG. 13) of the second plurality of first pivotable member projections 330 above the second plurality of first pivotable member valleys 332 is a third height. The second pivotable member 314 has a second pivotable member second engagement surface 334, which may also be referred to as a second engagement surface 334 of the second pivotable member 314, and which extends circumferentially about the pivot axis P and which has a second plurality of second pivotable member projections 336 which alternate with a second plurality of second pivotable member valleys 338. An axial height H4 (FIG. 14) of the second plurality of second pivotable member projections 336 above the second plurality of second pivotable member valleys 338 is a fourth height. Referring to FIGS. 11 and 12, the handlebar biasing member 340 may also be referred to as a pivot joint biasing member 340.

Referring to FIGS. 15-18, the pivot joint 342 may optionally further include a limiter post shown at 350 (FIGS. 16-18), which engages first and second limiter surfaces shown at 352 and 354 (FIG. 15) on a post 356 that may be similar to the post 350. These limiter surfaces 352 and 354 cooperate with the post 350 to prevent the handlebar 314 from traveling past the storage and use positions when being pivoted.

Figure 19:
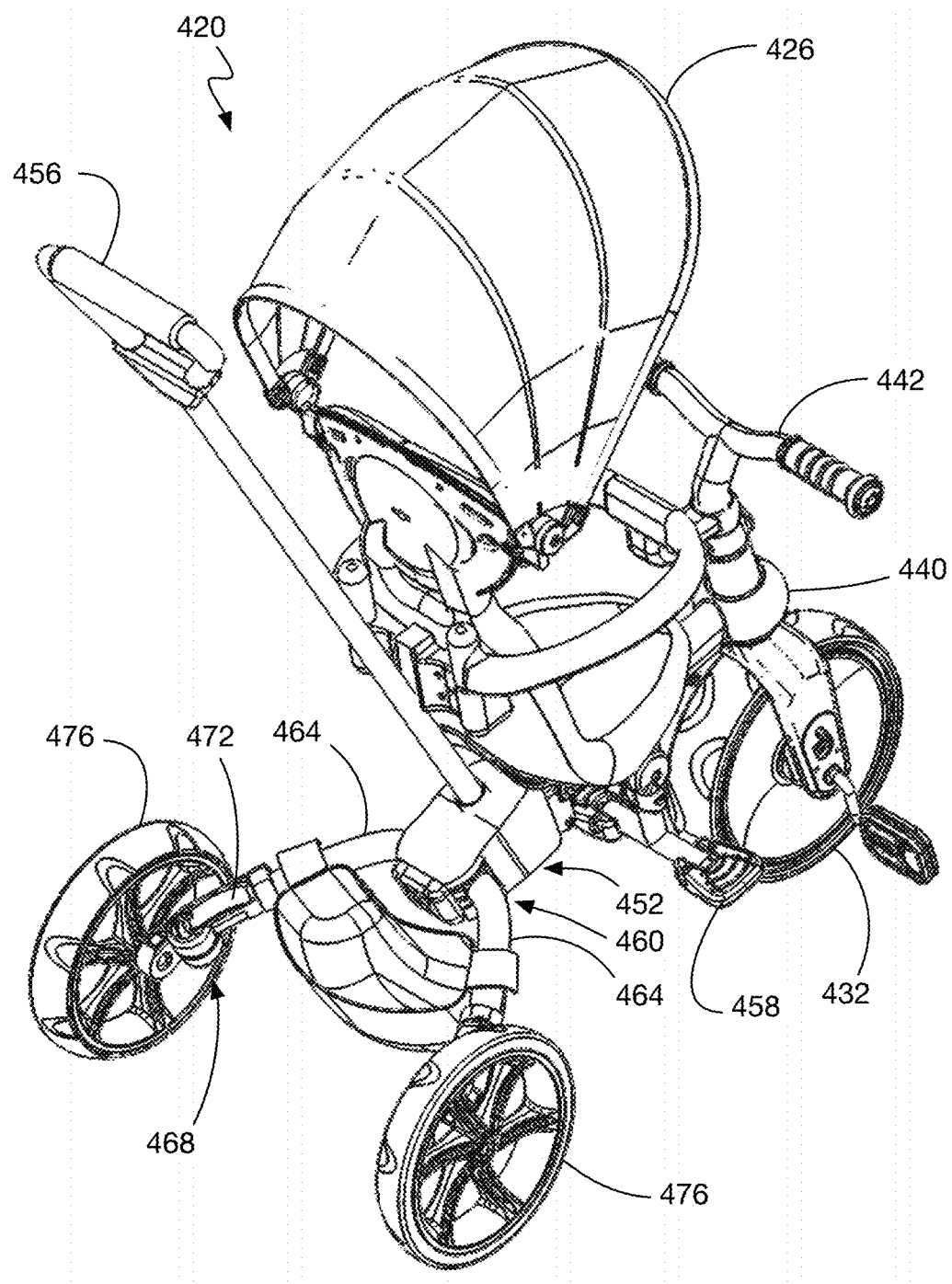
FIG. 19 shows a rear perspective view of a sport stroller in accordance with an embodiment of the disclosure.
Figure 20:
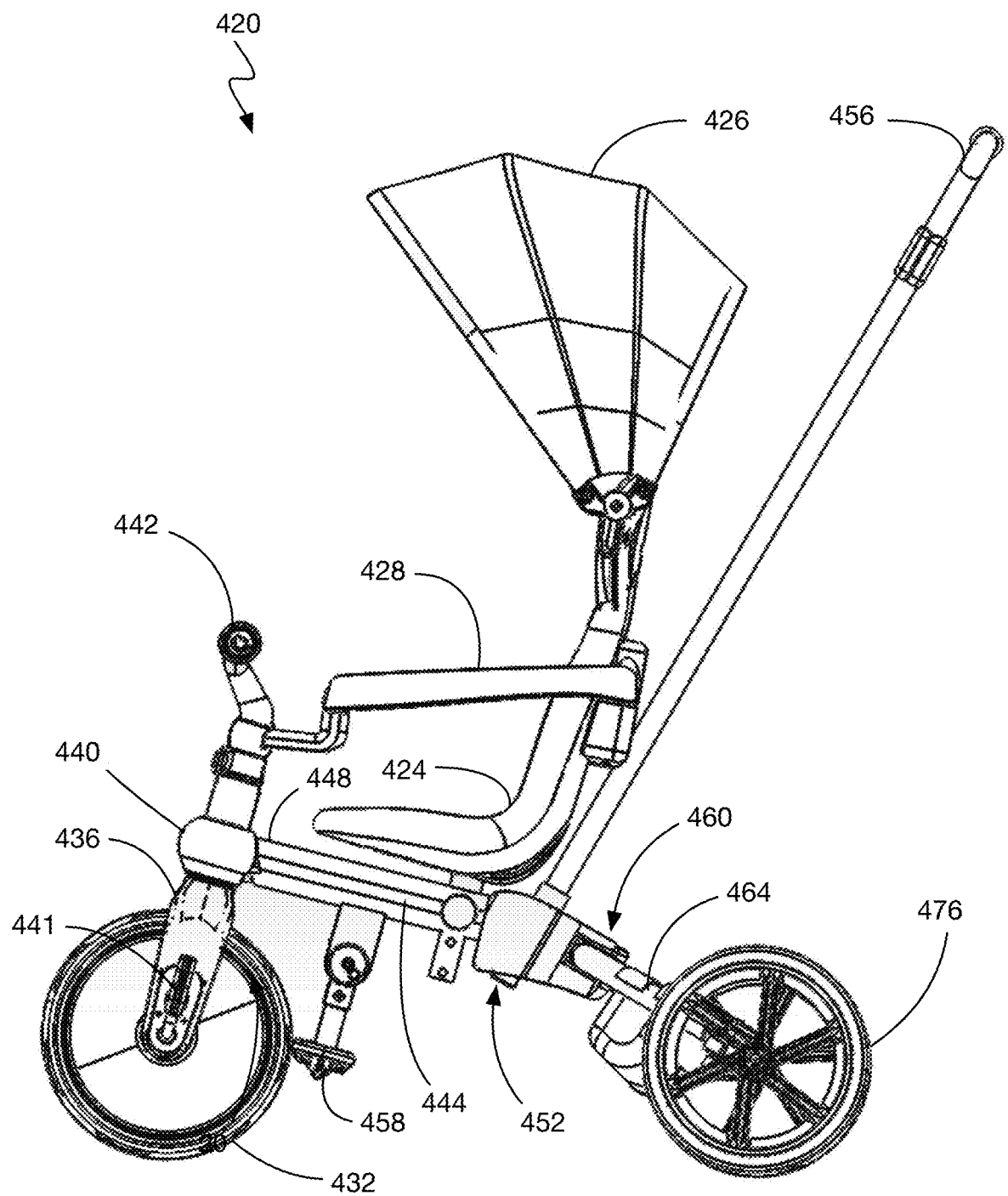
FIG. 20 shows a side view of the sport stroller of FIG. 19.
Figure 21:
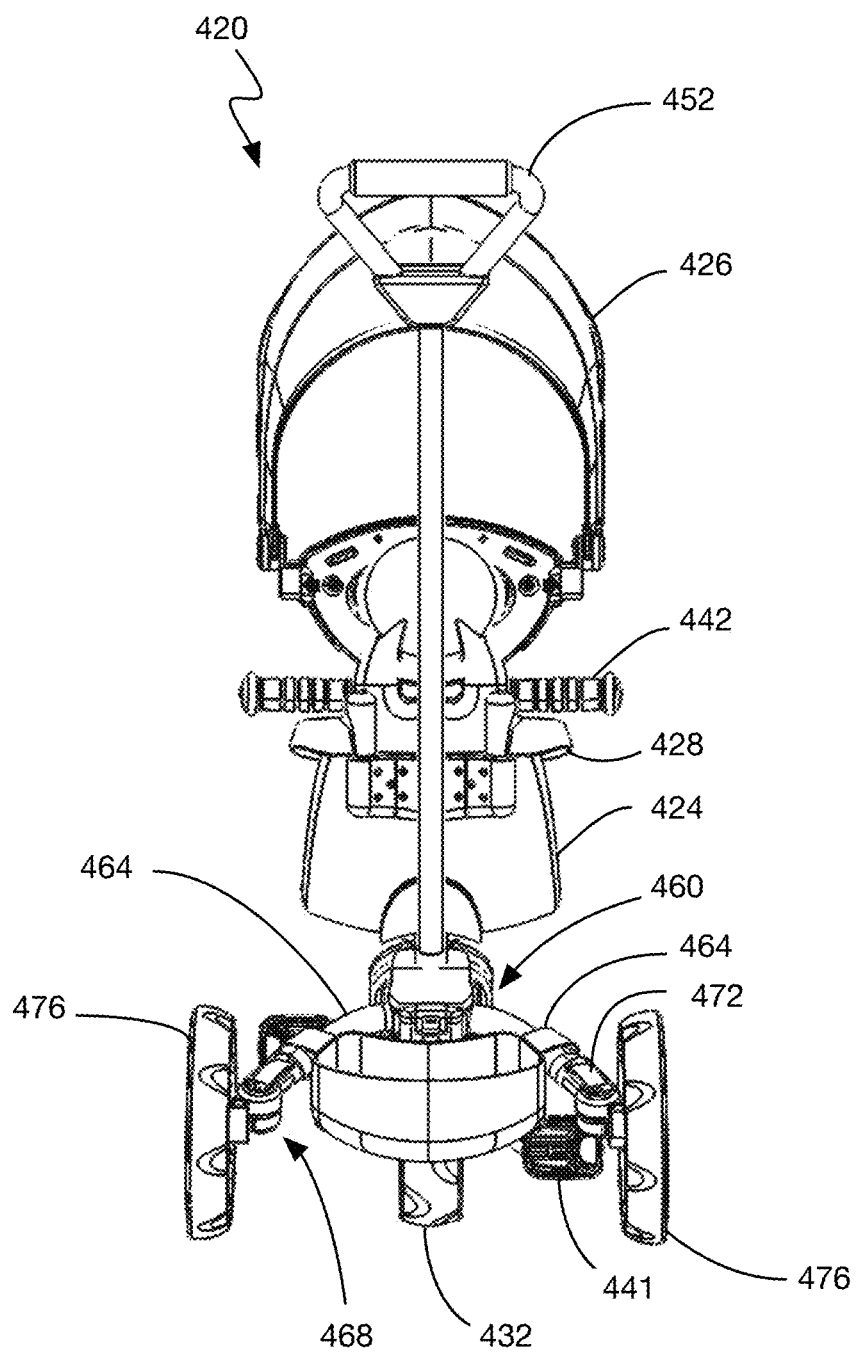
FIG. 21 shows a rear view of the sport stroller of FIG. 19.
Figure 22:
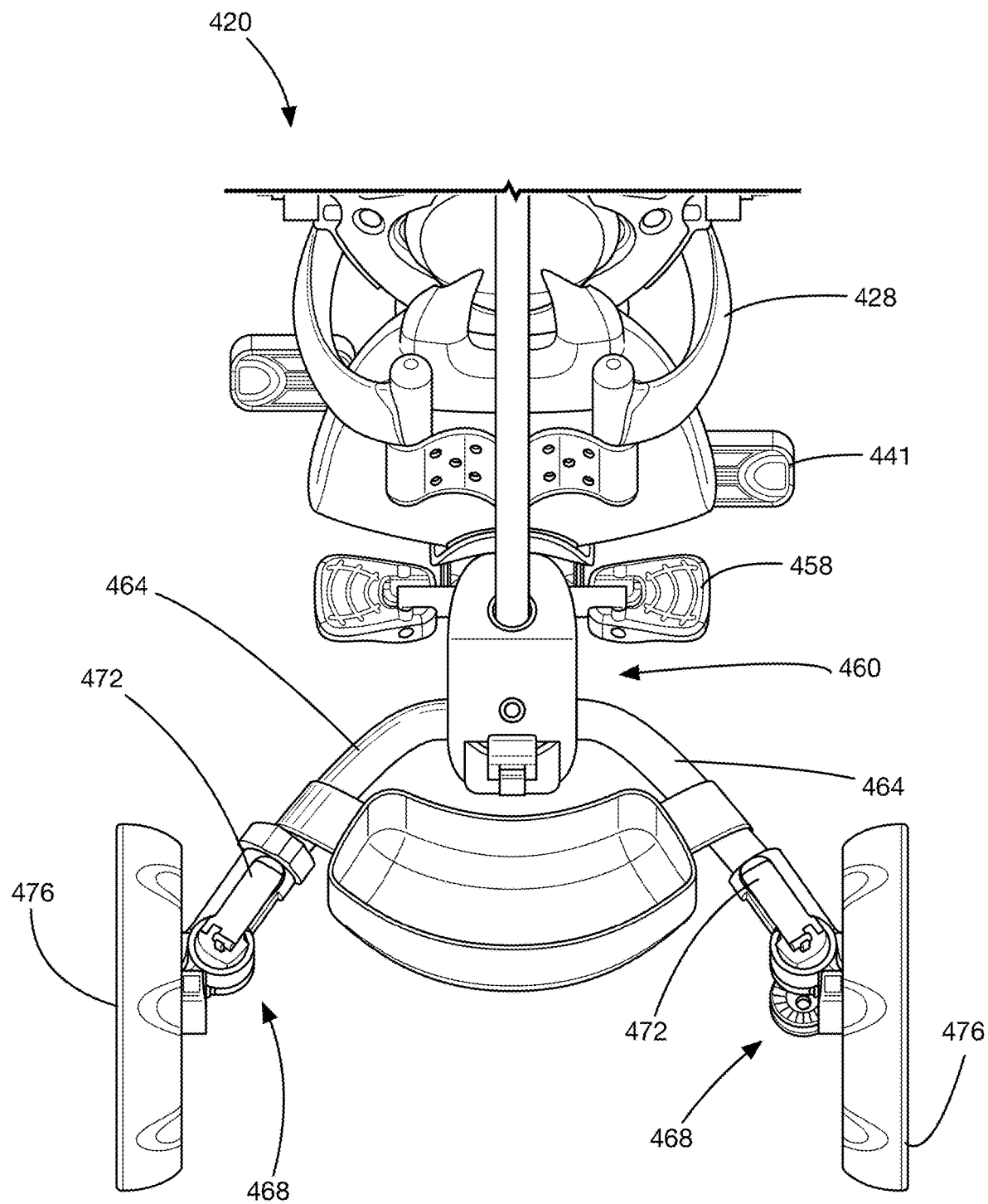
FIG. 22 shows a rear perspective sectional view of the sport stroller of FIG. 19 with a partially exploded view of a pivot joint for a rear wheel.

Reference is made to FIGS. 19-21 which show a vehicle in accordance with another embodiment of the present disclosure. The vehicle is a sport stroller 420 that has a seat 424 for supporting a child, a canopy 426 for protecting the seated child from sun and/or rain, and a safety guard 428 for restraining the child in the seat 424. A front wheel 432 is retained between a fork 436 that is rotatably held within a head tube 440. A pair of pedals 441 is coupled to front wheel 432 for driving sport stroller 420 forward, and a handlebar 442 enables a child to steer front wheel 432. A steering linkage 444 is coupled to the fork 436 in the head tube 440, and travels along a top tube 448 to a rear bracket 452 of the frame of the sport stroller 420. A handle 456 is rotatably held within the rear bracket 452 and coupled to the steering linkage 444 such that rotation of the handle 456 turns the fork 436 and the front wheel 432. As will be appreciated, sport stroller 420 can be operated by a child as a tricycle via the pedals 441 and a handlebar 442, or can be pushed and steered by an adult via the handle 456. In the latter case, a child seated on the sport stroller 420 can rest their feet on the foot rests 458 and the pedals 441 can be removed or disconnected so as not to spin with the front wheel 432.

The rear bracket 452 houses a central pivot joint 460. A pair of pivot members that pivot relative to each other via the central pivot joint 460, namely rear wheel struts 464, extend from central pivot joint 460. Each of the rear wheel struts 464 end at a wheel pivot joint 468. A lock lever 472 of a biasing mechanism, in this case a quick release skewer, locks and unlocks each the wheel pivot joint 468. Also coupled to each wheel pivot joint 468 is a rear wheel 476. As will be apparent, the rear bracket 452 of the frame is also a pivot member in central pivot joint 460, as the central pivot joint 460 permits pivoting of either or both of the rear wheel struts 464 relative to the rear bracket 452.

The sport stroller 420 is readily convertible between a three-wheel configuration and a two-wheel configuration. In the three-wheel configuration, as shown in FIGS. 19 to 22, the rear wheel struts 464 of the sport stroller 420 extend laterally and rearwardly in a splayed manner. The rear wheels 476 secured to the distal ends of the rear wheel struts 464 are held apart a distance so that the front wheel 432 and the rear wheels 476 afford stability and resistance to tipping over while the sport stroller 420 is unsupported or is being driven forward by a person via the handle 456.

In the two-wheel configuration, as will be described below, the rear wheels 476 are rotated about the wheel pivot joints 468 so that they are positioned between the rear wheel struts 464 of the sport stroller 420, and the rear wheel struts 464 are brought together so that the rear wheels 476 effectively form a single wheel. This wheel configuration makes the sport stroller 420 relatively more maneuverable.

Figure 23:
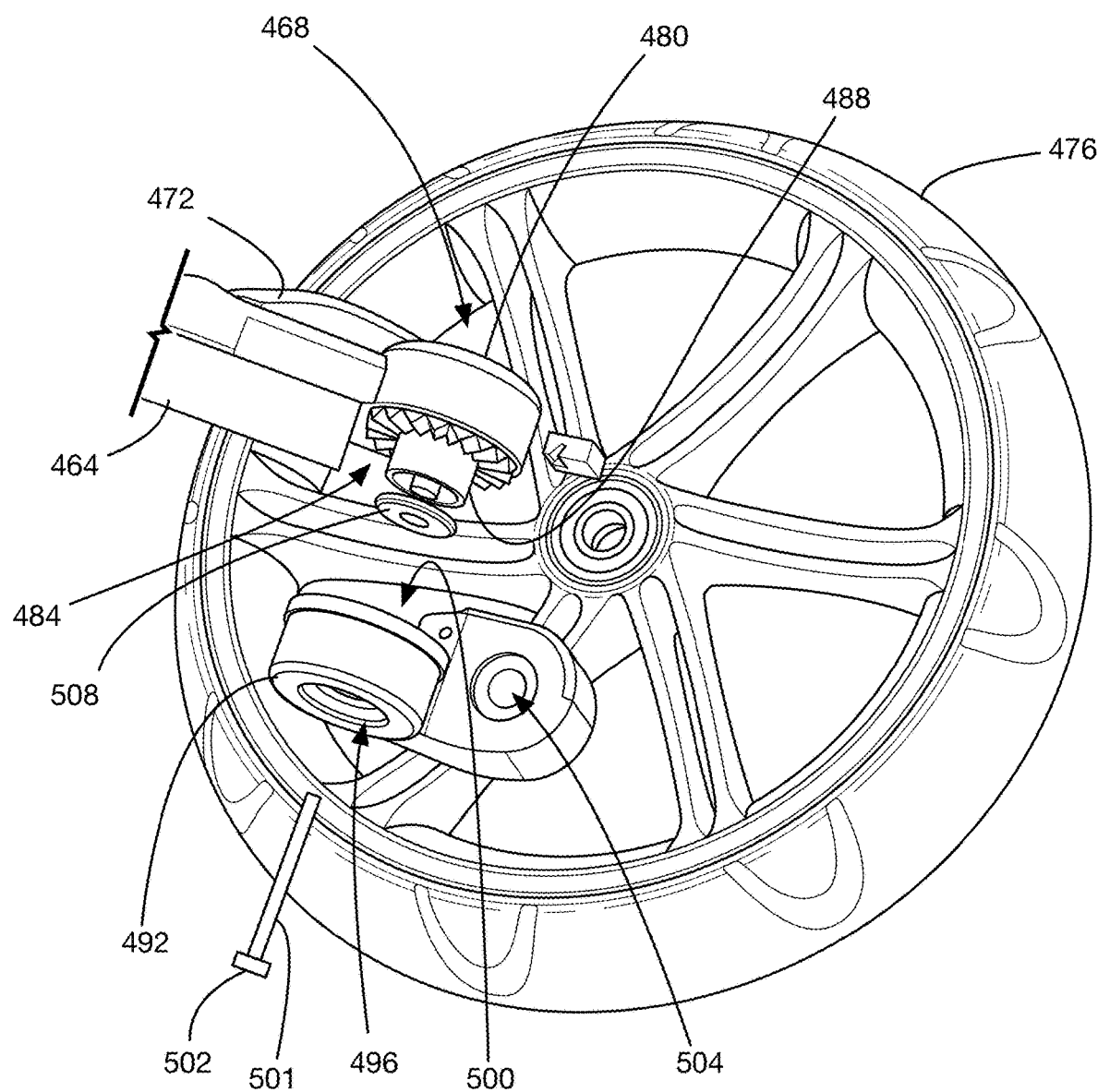
FIG. 23 shows an exploded sectional view of the right rear wheel and pivot joint of the sport stroller of FIG. 19.

Referring now to FIG. 23, wheel pivot joint 468 for the right rear wheel 476 is shown in greater detail. The rear wheel strut 464 has an enlarged end 480 that has a locking face 484 formed on a surface around a central post 488. Central post 488 has a coaxial aperture. A corresponding wheel support 492 has a bore 496 dimensioned to receive central post 488 snugly, and has a stepped diameter to limit travel of central post 488. A locking face 500 corresponding to locking face 484 is formed around bore 496. An axle bore 504 enables rotational coupling to the rear wheel 476 via an axle (not shown). A washer 508 is placed between the central post 488 and the bore 496 to spread pressure that is applied between the enlarged end 480 and the wheel support 492. The quick release skewer that biases the locking faces 484 and 500 together includes a tensioner member 501 pivotally coupled to the lever 472 and inserted through the aperture in the central post 488 and the bore 496 in the wheel support 492 and retained in place via an anchor member 502. The tensioner member 501 can be a rod, a cable, or the like, and the anchor member 502 may be secured to the tensioner member 501 or formed integrally therewith. The rear wheel strut 464 and the wheel support 492 are pivot members that pivot relative each other via the wheel pivot joint 468.

Figure 24:
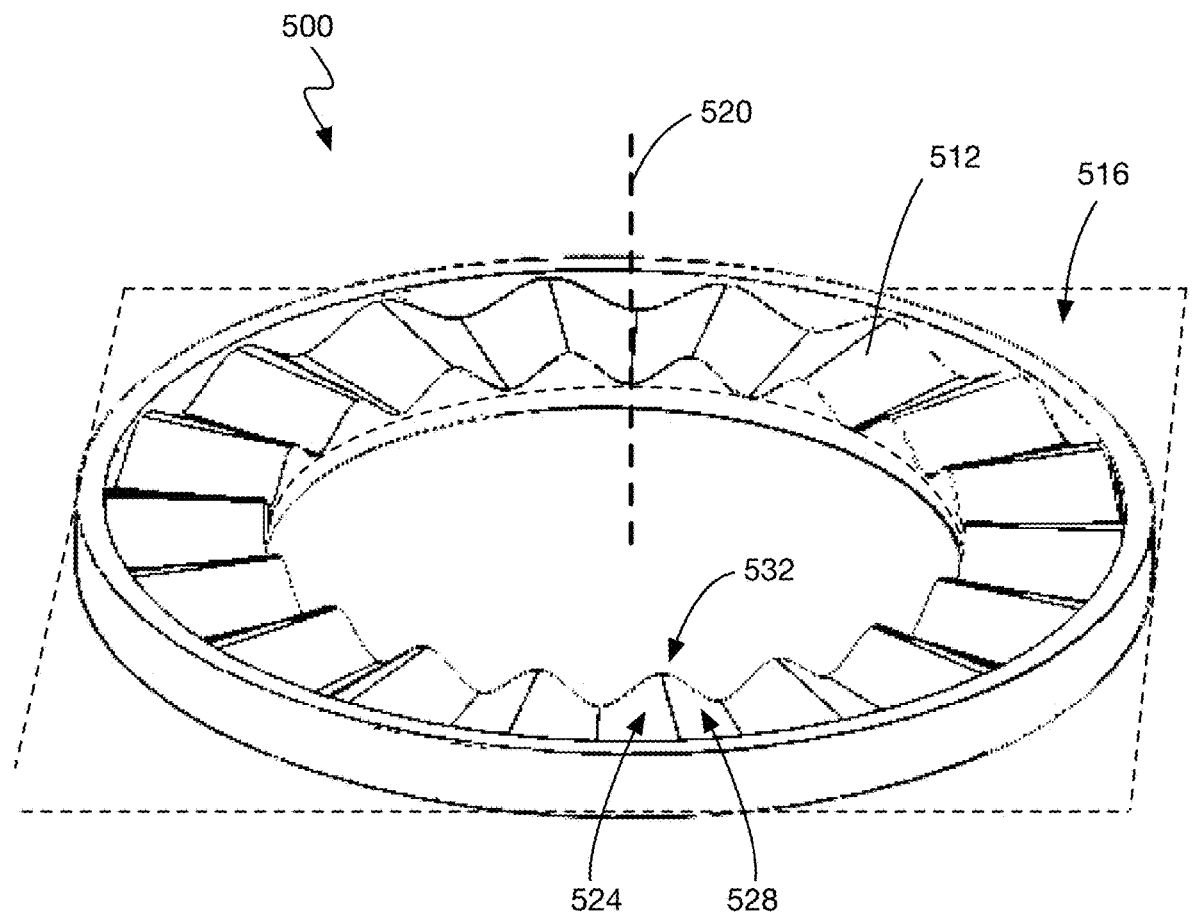
FIG. 24 shows the pattern of protrusions of a locking face of a wheel pivot joint of the sport stroller of FIG. 19.

FIG. 24 shows the locking face 500 in greater detail. The locking face 500 has a pattern of protrusions 512 that project from a face plane 516 optionally at regular angular intervals around a pivot axis 520, which is orthogonal to the face plane 516. The pattern of protrusions 512 may be generally sinusoidal in profile around the pivot axis 520, with the protrusions 512 extending radially about the pivot axis 520. It will be noted that the protrusions 512 could alternatively project at irregular intervals around the pivot axis 520 and could have varying widths instead of having a common width, while ensuring that the locking faces 500 and 482 nest together snugly in at least two different positions.

Figure 25:
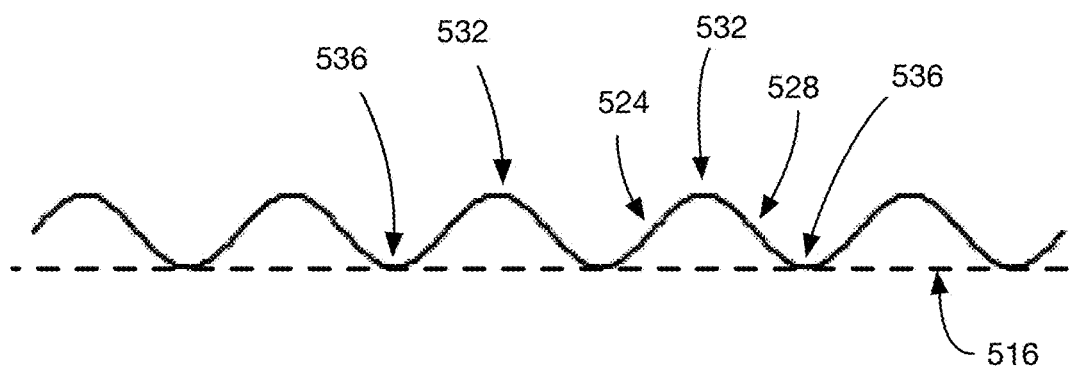
FIG. 25 shows the profile of the protrusions of the locking face of FIG. 24 along a line of fixed radius from a pivot axis of the wheel pivot joint.

Referring now to FIGS. 24 and 25, the shape of the protrusions 512 is discussed in greater detail. In particular, FIG. 25 shows the profile of the protrusions 512 along a line of fixed radius from the pivot axis 520. For the purpose of clarity, the profile of protrusions 512 will be discussed in a counter-clockwise direction in FIG. 24 and in a left-to-right direction in FIG. 25. Each protrusion 512 has an inclining surface region 524, a declining surface region 528, an apex surface region 532, and a trough surface region 536. The inclining surface region 524 has an inclination angle of approximately 40 degrees relative to the face plane 516. The declining surface region 528 has a declination angle of approximately 40 degrees relative to the face plane 516. Apex surface region 532 extends about 15% of the angular period of the locking face 500, includes the apex, and transitions between the inclination angle and the declination angle. Further, the apex surface region 532 is generally free of planar portions that are substantially parallel to the face plane 516, as such planar portions may enable opposing protrusions to rest thereon instead of being urged into the troughs between protrusions 512 by the biasing force of the biasing mechanism. The trough surface region 536 includes the nadir and transitions between a lower declination angle than that of the declining surface region 528 and a lower inclination angle than that of a subsequent inclining surface region 524.

It is desirable in some circumstances for the inclining surface region 524 (and the declining surface region 528, where it is desired to facilitate bi-directional pivoting) to have an inclination angle (or declination angle for the declining surface region 528) of at least about 30 degrees relative to the face plane 516 in order to resist rotation relative to the opposing locking face 484 when the wheel pivot joint 468 is compressed in a locked mode.

Further, it is desired to have the apex surface region 532 extend at least about 10% of the angular period. In some cases, it can be desired to have the apex surface region 532 extend at least about 20% of the angular period. This reduces the separation distance required between the locking faces 484 and 500.

In this particular embodiment, the apex surface region 532 and the trough surface region 536 transition smoothly to and from one another (i.e., substantially without discontinuities and therefore being generally free of radially-extending edges).

Further, the inclining surface region 524 and the apex surface region 532 are complements of the declining surface region 528 and trough the surface region 536, and the pattern of protrusions on the locking face 484 is the same as on locking face 500. As a result, the protrusions 512 of the locking face 484 and 500 complement and mesh when locking faces 484 and 500 are biased against each other.

Still further, in this embodiment, the inclining surface region 524 is a mirror image of the declining surface region 528.

In many cases, the inclination angle of the inclining surface region 524 relative to the face plane 516 is selected to be less than about 60 degrees relative to the face plane 516, as it has been found that if the inclination angle exceeds about 60 degrees, it may be difficult to pivot wheel support 492 relative to the rear wheel strut 464 even when the force biasing the locking faces 484 and 500 together is reduced. This angle depends on the friction coefficient of the materials used, the biasing force in the pivot mode, etc.

Referring now to FIGS. 23 to 25, the quick release skewer has two modes between which it can be conditioned. In a locked mode, the lever 472 is swiveled into a recess of the rear wheel strut 464, preventing accidental engagement of the lever 472 and applying a greater tension along the tensioner member 501 and thus a greater biasing force biasing the locking faces 484 and 500 together. In this mode, the biasing force is sufficient to inhibit relative rotation of the locking faces 484 and 500.

The quick release skewer can be conditioned to a pivot mode by urging a lever portion of the lever 472 out of the recess and away from the rear wheel strut 464, thus applying a lesser tension along the tensioner member 501 and thus a lesser biasing force biasing the locking faces 484 and 500 together. As can be seen, a cam-shaped portion of the lever 472 is contained in a recess of the enlarged end 480. In this mode, tension is reduced on a tensioner member 501 of the quick-release skewer and the biasing force is sufficiently weak to permit relative rotation of the locking face 484 and locking face 500 upon application of a threshold torque. The threshold torque is sufficient to rotate the locking face 484 relative to the locking face 500, thus overcoming the additional biasing force exerted by the quick release skewer as a result of the separation distance required between the locking faces 484 and 500, and any friction between them. Thus, the rear wheel 476 can be pivoted from its position shown in FIGS. 19 to 21 rearwardly and inwardly relative to the wheel pivot joint 468.

Upon pivoting the rear wheel 476, the lever 472 can be urged back into the recess of the rear wheel strut 464 to lock the rotational orientation of the rear wheel 476 relative to the rear wheel strut 464.

The left rear wheel 476 is pivoted inwardly around the corresponding wheel pivot joint 468.

Once rear wheels 476 are pivoted inwardly around the wheel pivot joints 468, the rear wheel struts 464 can be pivoted via the central pivot joint 460 to bring inwardly folded the rear wheels 476 together.

Figure 26:
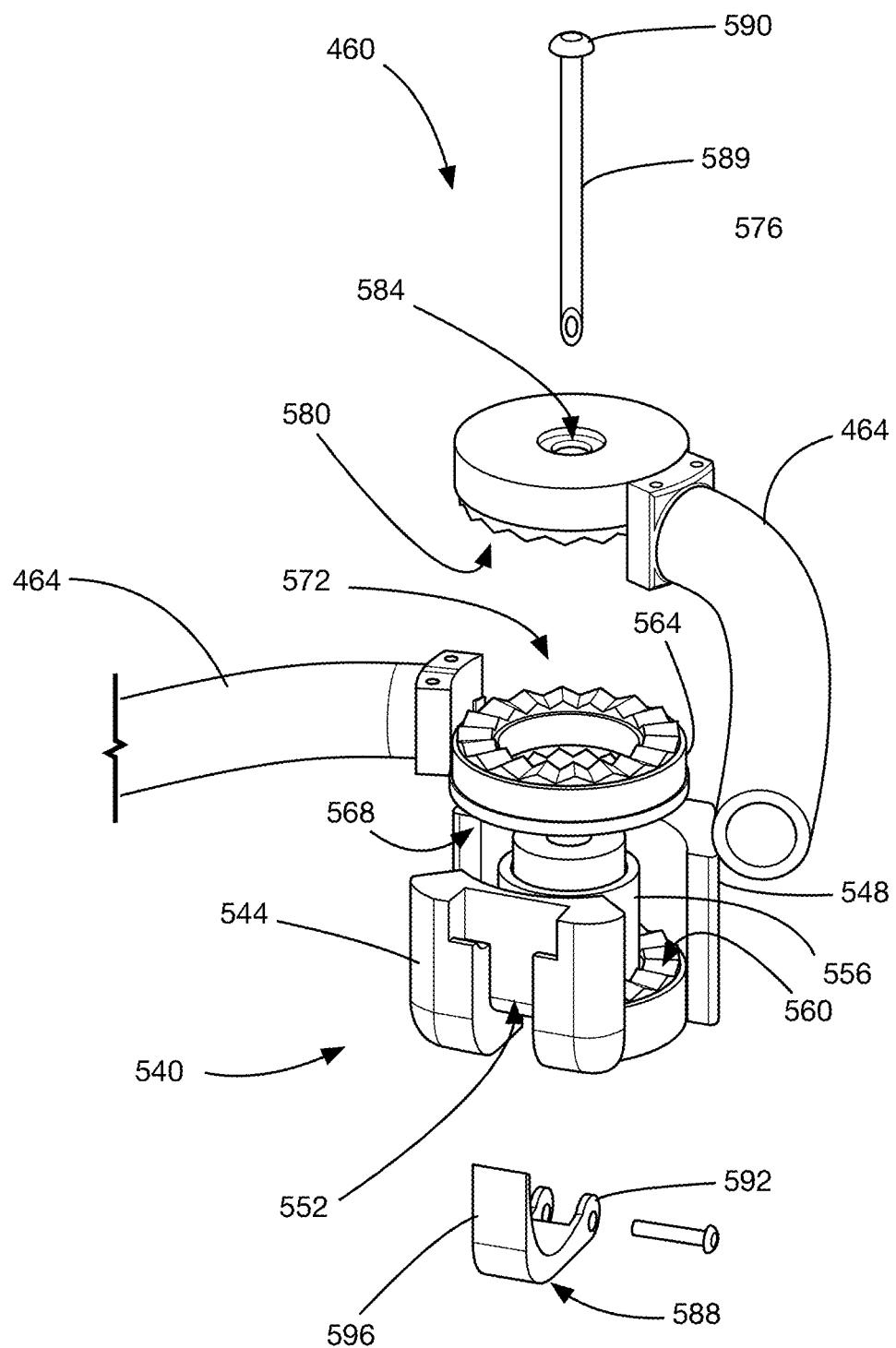
FIG. 26 shows a exploded sectional view of a pivot joint connecting rear wheel struts of the sport stroller of FIG. 19.

FIG. 26 shows various components of the central pivot joint 460. The central pivot joint 460 has a housing 540 that has a cylindrical cavity defined by two side walls 544 and 548. The side wall 544 has a recess 552 in its surface that extends along the base of housing 540. A central post 556 projects through the central cavity of the housing 540. A locking face 560 extends around the central post 556.

The left rear wheel strut 464 has an annular portion 564 dimensioned to fit snugly within the cavity of the housing 540 between central post 556 and side walls 544 and 548. The annular portion 564 has a first locking face 568 on a first side and a second locking face 572 on a second side.

The right rear wheel strut 464 has an annular portion 576 dimensioned to fit snugly within the cavity of housing 540 between the side walls 544 and 548 and capping the central post 556. Annular portion 576 has a locking face 580 on a first side and is generally planar on a second side, with an aperture 584 that aligns with an aperture in the central post 556 when annular portion 576 is placed within the cavity of housing 540.

The locking faces 560, 568, 572, and 580 have the same pattern of protrusions as the locking faces 484 and 500.

A quick release skewer holds together the central pivot joint 460 under tension. The quick release skewer has a lever 588 that is coupled to a tensioner member 589 at a first end. The tensioner member 589 passes through apertures in the central post 556 and annular portions 564 and 576 and is coupled to a tensioner anchor 590 at its other end.

The lever 588 has a cam-shaped portion 592 with a lever portion 596 extending therefrom for rotating the cam-shaped portion 592. The cam-shaped portion 592 is nested within the recess 552 in the base of the housing 540.

The quick release skewer of the central pivot joint 460 has two modes between which it can be conditioned. In a locked mode, the lever portion 596 is swiveled into and nests in the recess 552 of the housing 540, applying a greater tension along the tensioner member 589 and thus a greater biasing force biasing together corresponding pairs of locking faces 560 and 568, and 572 and 580. In this mode, the biasing force is sufficient to inhibit rotation of the locking face 560 relative to the locking face 568, and of the locking face 572 relative to the locking face 580.

The quick release skewer can be conditioned to a pivot mode by urging the lever portion 596 of the lever 588 out of the recess 552 and away from the housing 540, thus reducing tension along the tensioner member 589 and thus reducing the biasing force biasing the locking faces 560 and 568, and the locking faces 572 and 580 together. In this mode, the biasing force is sufficiently weak to permit rotation of the locking face 560 relative to the locking face 568, and of the locking face 572 relative to the locking face 580 upon application of a threshold torque. Thus, rear wheel struts 464 can be pivoted from their position shown in FIGS. 19 to 21 to bring the rear wheels 476 together. The gaps between the side walls 544 and 548 define the ranges of motion of the rear wheel struts 464.

Figure 27:
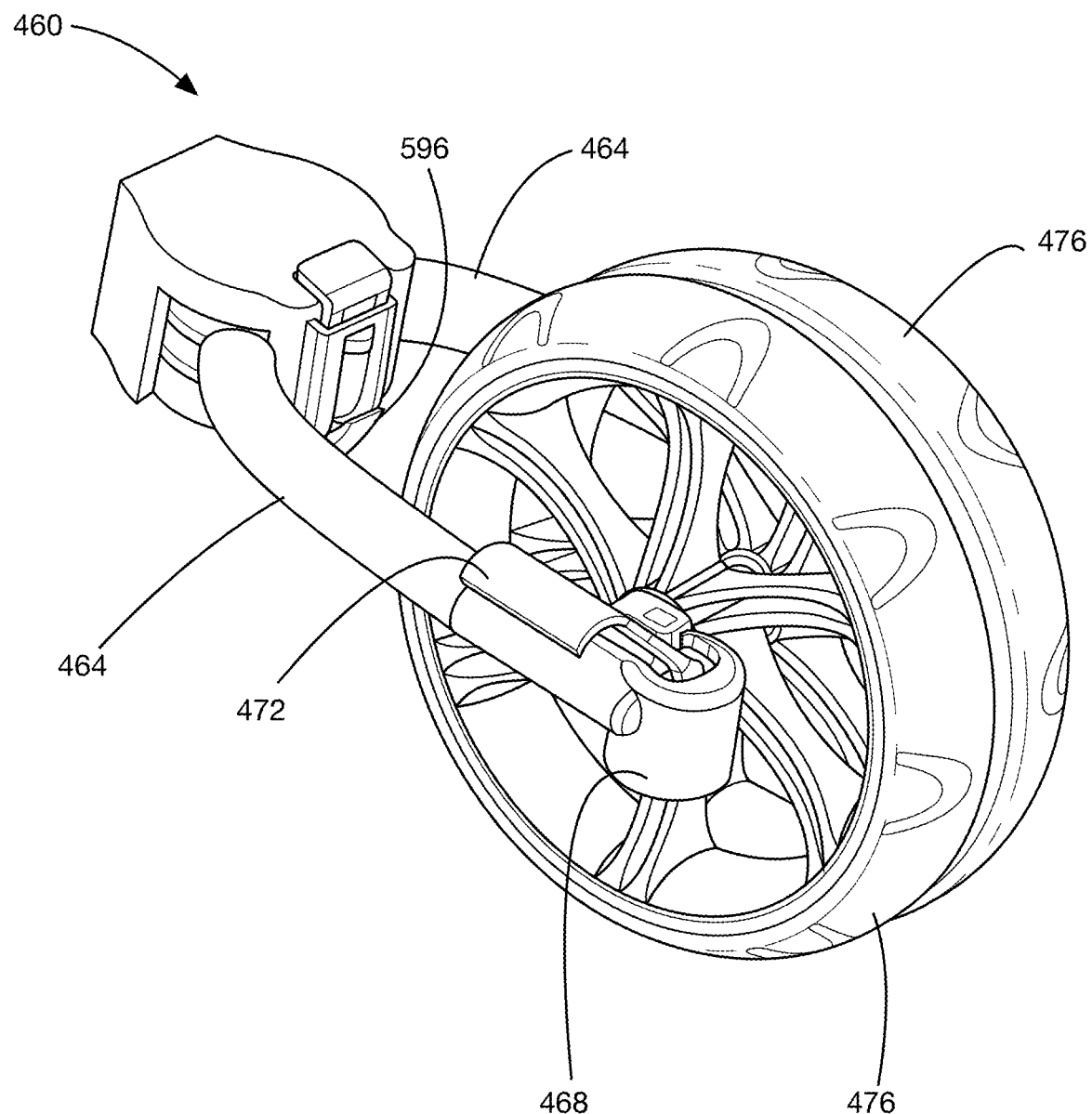
FIG. 27 shows a sectional view of the rear wheels, rear wheel struts, and central pivot joint of the sport stroller of FIG. 19.

FIG. 27 shows the configuration of the sport stroller 420 once rear wheels 476 have been brought together via pivoting of rear wheel struts 464. As shown, rear wheels 476 can effectively act as a single rear wheel in this configuration.

The lever portion 596 can be urged back into the recess 552 to lock the rear wheel struts 464 in this configuration.

When it is desired to recondition (i.e. reposition) the sport stroller 420 to be a three-wheeled vehicle as shown in FIGS. 19 to 21, the lever portion 596 is urged out of the recess 552 of housing 540 to reduce tension in the central pivot joint 460. The rear wheel struts 464 can then be pivoted to separate the rear wheels 476. Once rear wheel struts 464 are separated, the lever portion 596 is urged back into the recess 552, thereby locking rear wheel struts 464 in their relative orientation. For each rear wheel 476, lever 472 is urged out of its recess in rear wheel strut 464, and the rear wheel 476 is rotated about the wheel pivot joint 468 back to its position as shown in FIGS. 19 to 21. Lever 472 is then pushed back into the recess in the rear wheel strut 464 to lock rear wheel 476 in this position.

Figure 28:
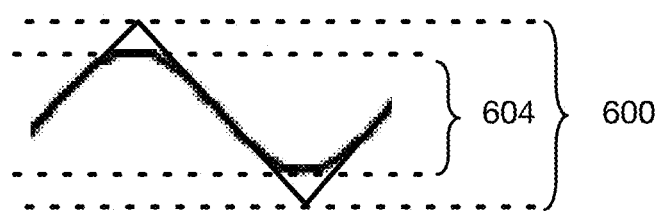
FIG. 28 shows the profile of the protrusions of FIG. 25 in comparison to the profile of prior art protrusions.

The pivot joints of the above embodiment require less of a reduction in tension going from a locked mode to a pivot mode in order to pivot one pivot member relative to another. This is because the relative separation distance required between the pivot members is reduced by as much as 35% or more in some scenarios. This is illustration in FIG. 28, in which a prior art protrusion pattern is superimposed on the protrusion pattern of FIG. 25. As can be seen, the separation distance 600 required with the prior art protrusion pattern is markedly larger than the separation distance 604 when using the protrusion pattern described herein. Further, the "peak" of the prior art protrusion pattern is a radially-extending edge that decreases smoothness of rotation of opposing locking faces.

The protrusion pattern of the above embodiment provides a smooth transition between adjustments as opposing protrusion patterns ease into the next adjustment instead of enabling the biasing mechanism to rapidly urge one locking face towards the other once the apexes are passed.

In can be advantageous in some scenarios to size the protrusions so that the relative positions of protrusions on opposing locking faces can be readily determined via a visual inspection, thus providing the user a visual indication when the pivot joint is securely fastened. In some scenarios, it has been found that protrusions having a visible width between apexes of at least about three millimeters and at least about three millimeters in height relative to the face plane enables the relative positions of protrusions on opposing locking faces to be readily determined visually.

The reduction in separation distance can reduce the amount of slack/rattle that is created in a pivot joint over time. As a result, a fixed cam lever that is calibrated at the factory is more likely to remain calibrated for a markedly longer period of time and has a reduced chance of mechanical failure. Further, less tension is required to be overcome in order to rotate one pivot member relative to another.

It will be appreciated that the protrusion pattern can be altered in various ways. For example, the depth of the troughs and/or the height of the apexes can be reduced.

The above protrusion patterns described facilitate rotational movement of one pivot member relative to another in two directions. Other protrusion patterns can be employed that facilitate rotation of a pivot member in one direction.

Figure 29:
FIG. 29 shows the profile of a pattern of protrusions in accordance with an alternative embodiment.
Figure 30:
FIG. 30 shows the profile of a pattern of protrusions in accordance with another alternative embodiment.

FIGS. 29 and 30 show two alternative protrusion patterns that facilitate counter-clockwise rotation of one pivot member relative to another, while still providing a reduced separation distance.

While the patterns of protrusion in the above-described embodiments all extend along radii originating at the pivot axis, various other patterns of protrusions can be employed such that two opposing locking faces have a number of angular intervals at which the protrusions of each locking face are received within troughs of the opposing locking face. For example, protrusions having sinusoidal profiles can be employed in concentric annuluses of the locking faces, where the protrusions are out-of-phase from one or more adjacent annuluses. The corresponding locking face is configured such that its protrusions along each of its corresponding concentric annuluses simultaneously fit within troughs of the locking face at a number of angular orientations. In another example, the protrusions may extend spirally on the locking faces.

The locking faces may be non-planar. For example, opposing locking faces may be conical, with one being convex and the other being concave. It is desired, however, to have protrusions on the locking faces that are equidistant from the pivot axis to be co-planar on their own face planes. Thus, locking faces may have more than one face plane.

The angular period of the locking faces can be varied significantly while remaining within the teachings of the disclosure. In the embodiment described above, an angular period of 20 degrees is employed. In another embodiment, the angular period can be 30 degrees. In a further embodiment, the angular period can be 60 degrees.

Throughout the present disclosure, the terms 'protrusion', 'apex surface region', and 'projection' may be substituted for one another; the term 'trough surface region' and the term 'valley' may be substituted for one another; the term Persons skilled in the art will appreciate that there are yet more alternative implementations and modifications possible, and that the above examples are only illustrations of one or more implementations. The scope, therefore, is only to be limited by the claims appended hereto.

What is claimed is:

1. A foot-deck-based vehicle, comprising:
   a foot deck having a front end and a rear end;
   a front wheel assembly mounted at the front end of the foot deck and a rear wheel assembly mounted at the rear end of the foot deck;
   a handlebar mount on the foot deck and a handlebar that extends from the handlebar mount,
   wherein the handlebar mount defines a handlebar pivot axis and has a handlebar mount engagement surface extending circumferentially about the handlebar pivot axis and having a plurality of handlebar mount projections which alternate with a first plurality of handlebar mount valleys, wherein an axial height of the plurality of handlebar mount projections above the plurality of handlebar mount valleys is a handlebar mount projection height,
   wherein the handlebar has a handlebar engagement surface extending circumferentially about the handlebar pivot axis and having a plurality of handlebar projections which alternate with a plurality of handlebar valleys, wherein an axial height of the plurality of handlebar projections above the plurality of handlebar valleys is a handlebar mount projection height,
   wherein the handlebar is precessively pivotable about the handlebar pivot axis between a use position and a storage position, wherein the handlebar has a distal end that is farther away from the foot deck when the handlebar is in the use position than when the handlebar is in the storage position,
   and wherein, during pivoting of the handlebar between the use and storage positions, engagement of the handlebar projections with the handlebar mount projections hold the handlebar away from the foot deck such that there is a gap present between a circumferential surface of the handlebar and a corresponding circumferential surface of the foot deck about the handlebar pivot axis,
   wherein at the use and storage positions the handlebar projections engage the handlebar mount valleys and the handlebar mount projections engage the handlebar valleys, such that the circumferential surface of the handlebar and the corresponding circumferential surface of the foot deck are closer together than during pivoting of the handlebar between the use and storage positions,
   a locking member that is positionable in a lock position in which the locking member holds the handlebar at at least one of the use and storage positions to keep the handlebar projections engaged with the handlebar mount valleys and the handlebar mount projections engaged with the handlebar valleys, and a release position in which the locking member permits the handlebar to move to disengage the handlebar projections from the handlebar mount valleys and to disengage the handlebar mount projections from the handlebar valleys, and to pivot between the use and stowage positions,
   wherein the gap that is present during pivoting of the handlebar between the use and storage positions visually indicates that the handlebar is unlocked and is at a transitional position other than the use position and the stowage position.

2. A foot-deck-based vehicle as claimed in claim 1, wherein in the use position the handlebar extends generally perpendicularly to a foot-support surface of the foot deck and in the storage position the handlebar extends generally parallel to the foot-support surface.

3. A foot-deck-based vehicle as claimed in claim 1, wherein the front wheel assembly includes
   a front wheel support having a first end with a first front wheel rotatably mounted thereto and a second end with a second front wheel rotatably mounted thereto, and wherein the front wheel support is pivotably mounted to the foot deck about a front wheel support pivot axis that is at an angle of greater than 0 degrees and less than 90 degrees from a vertical axis such that leaning on a first side or on a second side of the foot deck causes pivoting of the front wheel support, and
   a front wheel support biasing member that urges the front wheel support towards a neutral position when the front wheel support is pivoted away from the neutral position.

4. A collapsing foot-deck-based vehicle according to claim 3, wherein the front wheel support pivot axis is inclined between about 30 degrees and about 60 degrees from the horizontal plane.

5. A collapsing foot-deck-based vehicle according to claim 3, wherein the foot deck comprises:
   a generally planar portion; and
   a generally sloped portion extending from the generally planar portion at a fore end thereof.

6. A foot-deck-based vehicle, comprising:
   a foot deck having a front end and a rear end;
   a front wheel assembly mounted at the front end of the foot deck and a rear wheel assembly mounted at the rear end of the foot deck;
   a handlebar mount on the foot deck and a handlebar that extends from the handlebar mount,
   wherein the handlebar mount defines a handlebar pivot axis and has a handlebar mount engagement surface extending circumferentially about the handlebar pivot axis and having a plurality of handlebar mount projections which alternate with a first plurality of handlebar mount valleys, wherein an axial height of the plurality of handlebar mount projections above the plurality of handlebar mount valleys is a handlebar mount projection height,
   wherein the handlebar has a handlebar engagement surface extending circumferentially about the handlebar pivot axis and having a plurality of handlebar projections which alternate with a plurality of handlebar valleys, wherein an axial height of the plurality of handlebar projections above the plurality of handlebar valleys is a handlebar mount projection height,
   wherein the handlebar is precessively pivotable about the handlebar pivot axis between a use position and a storage position, wherein the handlebar has a distal end that is farther away from the foot deck when the handlebar is in the use position than when the handlebar is in the storage position,
   and wherein, during pivoting of the handlebar between the use and storage positions, engagement of the handlebar projections with the handlebar mount projections hold the handlebar away from the foot deck such that there is a gap present between a circumferential surface of the handlebar and a corresponding circumferential surface of the foot deck about the handlebar pivot axis, wherein at the use and storage positions the handlebar projections engage the handlebar mount valleys and the handlebar mount projections engage the handlebar valleys, such that the circumferential surface of the handlebar and the corresponding circumferential surface of the foot deck are closer together than during pivoting of the handlebar between the use and storage positions, a first locking face on the foot deck and a second locking face on the handlebar, and a biasing member that urges the first locking face and the second locking face towards engagement with one another, wherein when the handlebar is in one of the use and storage positions, the biasing member urges the first and second locking faces into engagement with one another to inhibit pivoting of the handlebar out of said one of the use and storage positions, and wherein, movement of the handlebar to a transitional position between the use and stowage positions the first and second locking faces brings the second locking face to a position in which the second locking face is spaced from the first locking face and is unable to engage the first locking face thereby permitting pivoting of the handlebar.

7. A foot-deck-based vehicle as claimed in claim 6, wherein in the use position the handlebar extends generally perpendicularly to a foot-support surface of the foot deck and in the storage position the handlebar extends generally parallel to the foot-support surface.

8. A foot-deck-based vehicle as claimed in claim 6, wherein the front wheel assembly includes
a front wheel support having a first end with a first front wheel rotatably mounted thereto and a second end with a second front wheel rotatably mounted thereto, and wherein the front wheel support is pivotably mounted to the foot deck about a front wheel support pivot axis that is at an angle of greater than 0 degrees and less than 90 degrees from a vertical axis such that leaning on a first side or on a second side of the foot deck causes pivoting of the front wheel support, and
a front wheel support biasing member that urges the front wheel support towards a neutral position when the front wheel support is pivoted away from the neutral position.

9. A collapsing foot-deck-based vehicle according to claim 8, wherein the front wheel support pivot axis is inclined between about 30 degrees and about 60 degrees from the horizontal plane.

10. A collapsing foot-deck-based vehicle according to claim 8, wherein the foot deck comprises:
a generally planar portion; and
a generally sloped portion extending from the generally planar portion at a fore end thereof.

\* \* \* \* \*